US012717418B2

(12) United States Patent
Ionescu et al.

(10) Patent No.: US 12,717,418 B2
(45) **Date of Patent: *Aug. 25, 2026**

(54) SYSTEM AND METHOD FOR USER RECOGNITION USING MOTION SENSOR DATA

(71) Applicant: Veridium IP Limited, London (GB)

(72) Inventors: Radu Tudor Ionescu, London (GB); Adrian Ionut Ungureanu, London (GB); Ionut Dumitran, London (GB)

(73) Assignee: Veridium IP Limited, London (GB)

( * ) Notice: Subject to any disclaimer, the term of this patent is extended or adjusted under 35 U.S.C. 154(b) by 17 days.

This patent is subject to a terminal disclaimer.

(21) Appl. No.: 18/335,748

(22) Filed: Jun. 15, 2023

(65) Prior Publication Data

US 2023/0409123 A1 Dec. 21, 2023

Related U.S. Application Data

(63) Continuation of application No. 16/356,399, filed on Mar. 18, 2019, now Pat. No. 11,733,780.

(Continued)

(51) Int. Cl.

*G06F 3/01* (2006.01)
*G06F 17/15* (2006.01)

(Continued)

(52) U.S. Cl.

CPC .............. *G06F 3/017* (2013.01); *G06F 3/011* (2013.01); *G06F 17/15* (2013.01); *G06F 17/18* (2013.01); *G06N 3/084* (2013.01); *G06N 20/00* (2019.01)

(58) Field of Classification Search

CPC .......... G06F 3/017; G06F 3/011; G06F 17/15; G06F 17/18; G06N 20/00; G06N 3/084

See application file for complete search history.

(56) References Cited

U.S. PATENT DOCUMENTS 8,189,866 B1 5/2012 Gu et al.
9,001,199 B2 * 4/2015 Sinha .................. G06V 40/103 348/77

(Continued)

OTHER PUBLICATIONS

Kanagasundaram, Ahilan, et al. I-vector based speaker recognition on short utterances. Proceedings of the 12th Annual Conference of the International Speech Communication Association. International Speech Communication Association (ISCA), 2011: pp. 2341-2344.

(Continued)

*Primary Examiner* — Stephen S Hong
*Assistant Examiner* — Darrin Hope
(74) *Attorney, Agent, or Firm* — LEASON ELLIS LLP

(57) ABSTRACT

Technologies are presented herein in support of system and methods for user recognition using motion sensor data. Embodiments of the present invention concern a system and method for capturing motion sensor data using motion sensors of a mobile device and characterizing the motion sensor data into features for user recognition. The motion sensor data of a user is collected by the motion sensors of a mobile device in the form of a motion signal. One or more sets of features are extracted from the motion signal and a subset of discriminative features are then selected. The subset of features is analyzed, and a classification score is generated to classify the user as a genuine user or an imposter user.

18 Claims, 17 Drawing Sheets

Related U.S. Application Data

(60) Provisional application No. 62/652,114, filed on Apr. 3, 2018, provisional application No. 62/644,125, filed on Mar. 16, 2018.

(51) Int. Cl.

| | |
|---|---|
| ***G06F 17/18*** | (2006.01) |
| ***G06N 3/084*** | (2023.01) |
| ***G06N 20/00*** | (2019.01) |

(56) References Cited

U.S. PATENT DOCUMENTS

| | | | | |
|---|---|---|---|---|
| 10,002,244 | B2 | 6/2018 | LaCous et al. | |
| 10,373,708 | B2 * | 8/2019 | Xiang | G06N 5/027 |
| 10,861,170 | B1 | 12/2020 | Li et al. | |
| 2013/0142426 | A1 | 6/2013 | Kaneda et al. | |
| 2014/0207401 | A1 * | 7/2014 | Sung | G01C 21/16 702/95 |
| 2017/0227995 | A1 | 8/2017 | Lee et al. | |
| 2017/0357848 | A1 * | 12/2017 | Su | G06F 3/017 |
| 2018/0039745 | A1 | 2/2018 | Chevalier et al. | |
| 2018/0337937 | A1 | 11/2018 | Saunders et al. | |

OTHER PUBLICATIONS

Kenny, Patrick, et al. A study of inter-speaker variability in speaker verification. IEEE Transactions on Audio, Speech, and Language Processing 16.5 (2008): 980-988.

Kinnunen, Tomi, and Haizhou Li. An overview of text-independent speaker recognition: From features to supervectors. Speech communication, vol. 52, No. 1 : pp. 12-40, 2010.

D. R. González, J. R. Calvo de Lara. Speaker verification with shifted delta cepstral features: Its Pseudo-Prosodic Behaviour. In: Proceedings of I Iberian SLTech, 2009: pp. 85-88.

W. Shi, J. Yang, Y. Jiang, F. Yang, Y. Xiong. SenGuard: Passive user identification on smartphones using multiple sensors. In: Proceedings of International Conference on Wireless and Mobile Computing, Networking and Communications, 2011: pp. 141-148.

A. Buriro, B. Crispo, F. Del Frari, J. Klardie, K. Wrona. ITSME: Multi-modal and Unobtrusive Behavioural User Authentication for Smartphones. In: Proceedings of International Conference on Passwords, pp. 45-61, 2015.

A. Buriro, B. Crispo, F. Del Frari, K. Wrona. Hold & Sign: A Novel Behavioral Biometrics for Smartphone User Authentication. In: Proceedings of Security and Privacy Workshops, 2016: pp. 276-285.

A. Buriro, s. Gupta, B. Crispo. Evaluation of Motion-Based Touch-Typing Biometrics for Online Banking. In: Proceedings of International Conference of the Biometrics Special Interest Group, 2017.

A. Buriro, B. Crispo, Y. Zhauniarovich. Please hold on: Unobtrusive user authentication using smartphone's built-in sensors. In: Proceedings of International Conference on Identity, Security and Behavior Analysis, 2017.

N. Neverova, C. Wolf, G. Lacey, L. Fridman, D. Chandra, B. Barbello, G. Taylor. Learning Human Identity From Motion Patterns. IEEE Access, vol. 4, pp. 1810-1820, 2016.

L. Sun, Y. Wang, B. Cao, P. S. Yu, W. Srisa-an, A. D. Leow. Sequential Keystroke Behavioral Biometrics for Mobile User Identification via Multi-view Deep Learning. In: Proceedings of Joint European Conference on Machine Learning and Knowledge Discovery in Databases, pp. 228-240, 2017.

G. Bailador, C. Sanchez-Avila, J. Guerra-Casanova, A. de Santos Sierra. Analysis of pattern recognition techniques for in-air signature biometrics. Pattern Recognition, vol. 44, No. 10-11, pp. 2468-2478, 2011.

C. Shen, T. Yu, S. Yuan, S., Y. Li, X. Guan. Performance analysis of motion-sensor behavior for user authentication on smartphones. Sensors, vol. 16, No. 3, pp. 345-365, 2016.

N. Dalal, T. Bill. Histograms of oriented gradients for human detection. Computer Vision and Pattern Recognition, vol. 1, pp. 886-893, 2005.

J. Zhao, L. Itti. Classifying time series using local descriptors with hybrid sampling. IEEE Transactions on Knowledge and Data Engineering 28, No. 3, pp. 623-637, 2017.

S. Karlin. A first course in stochastic processes. Academic press, pp. 27-60, 1975.

S. Lazebnik, C. Schmid, J. Ponce. Beyond Bags of Features: Spatial Pyramid Matching for Recognizing Natural Scene Categories. In: Proceedings of IEEE Conference on Computer Vision and Pattern Recognition, vol. 2, pp. 2169-2178, 2006.

R. T. Ionescu, M. Popescu, C. Grozea. Local Learning to Improve Bag of Visual Words Model for Facial Expression Recognition. In Proceedings of Workshop on Challenges in Representation Learning, ICML, 2013.

C. Papageorgiou, T. Poggio. A trainable system for object detection. International Journal of Computer Vision, vol. 38, No. 1, pp. 15-33, 2000.

D. H. Wolpert. Stacked generalization. Neural Networks, vol. 5, pp. 241-259, 1992.

* cited by examiner

Data Collection
S105
Raw Data
Feature Extraction
S110
Features
Perform Feature Selection?
Yes
No
Feature Selection
S115
Discriminative Features
Features
Classification
S120
Results

FIG. 6

| Index | Type | Input layer(s) index | Name | Input shape | Number of filters | Kernel size | Stride | Padding | Output shape | Details |
|---|---|---|---|---|---|---|---|---|---|---|
| 0 | input | - | Input | $X_1 \times Y_1 \times F_1$ | - | - | - | - | $X_1 \times Y_1 \times F_1$ | |
| 1 | batch norm | 0 | BatchNorm1 | $X_1 \times Y_1 \times F_1$ | - | - | - | - | $X_1 \times Y_1 \times F_1$ | Used only if not first residual block |
| 2 | ELU | 1 | EluLayer1 | $X_1 \times Y_1 \times F_1$ | - | - | - | - | $X_1 \times Y_1 \times F_1$ | Used only if not first residual block |
| 3 | conv | 2 | Conv1 | $X_1 \times Y_1 \times F_1$ | $F_1$ | $K_1 \times 7$ | 1 x 1 | Same | $X_1 \times Y_1 \times F_1$ | |
| 4 | batch norm | 3 | BatchNorm2 | $X_1 \times Y_1 \times F_1$ | - | - | - | - | $X_1 \times Y_1 \times F_1$ | |
| 5 | ELU | 4 | EluLayer2 | $X_1 \times Y_1 \times F_1$ | - | - | - | - | $X_1 \times Y_1 \times F_1$ | |
| 6 | conv | 5 | Conv2 | $X_1 \times Y_1 \times F_1$ | $F_1$ | $K_1 \times 7$ | 1 x 1 | Same | $X_1 \times Y_1 \times F_1$ | |
| 7 | sum | 0, 6 | Output | $X_1 \times Y_1 \times F_1$ | - | - | - | - | $X_1 \times Y_1 \times F_1$ | Output=Input + Conv2 |

FIG. 7

| Index | Type | Input layer(s) index | Name | Input shape | Number of filters | Kernel shape | Stride | Padding | Output shape | Details |
|---|---|---|---|---|---|---|---|---|---|---|
| 0 | Input | - | Input | $X_1 \times Y_1 \times F_1$ | - | - | - | - | $X_1 \times Y_1 \times F_1$ | |
| 1 | batch norm | 0 | BatchNorm1 | $X_1 \times Y_1 \times F_1$ | - | - | - | - | $X_1 \times Y_1 \times F_1$ | Used only if not first residual block |
| 2 | ELU | 1 | EluLayer1 | $X_1 \times Y_1 \times F_1$ | - | - | - | - | $X_1 \times Y_1 \times F_1$ | Used only if not first residual block |
| 3 | conv | 2 | Conv1 | $X_1 \times Y_1 \times F_1$ | $F_2$ | $K_1 \times 7$ | $S_1 \times 2$ | Same | $X_2 \times Y_2 \times F_2$ | |
| 4 | batch norm | 3 | BatchNorm2 | $X_2 \times Y_2 \times F_2$ | - | - | - | - | $X_2 \times Y_2 \times F_2$ | |
| 5 | ELU | 4 | EluLayer2 | $X_2 \times Y_2 \times F_2$ | - | - | - | - | $X_2 \times Y_2 \times F_2$ | |
| 6 | conv | 5 | Conv2 | $X_2 \times Y_2 \times F_2$ | $F_2$ | $K_1 \times 7$ | 1 x 1 | Same | $X_2 \times Y_2 \times F_2$ | |
| 7 | average pooling | 0 | Pool | $X_1 \times Y_1 \times F_1$ | - | - | $S_1 \times 2$ | Same | $X_2 \times Y_2 \times F_1$ | Applied only on input layer (0) |
| 8 | padding | 7 | Pad | $X_2 \times Y_2 \times F_1$ | - | - | - | $(F_2-F_1)/2$, $(F_2-F_1)/2$ | $X_2 \times Y_2 \times F_2$ | Pad third dimension with values of 0 |
| 9 | sum | 6, 8 | Output | $X_2 \times Y_2 \times F_2$ | - | - | - | - | $X_2 \times Y_2 \times F_2$ | Output=Pad + Conv2 |

FIG. 8

| | Index | Type | Name | Input shape | ResNet Zone Index | Number of filters | Kernel shape | Stride | Padding | Output shape | Details |
|---|---|---|---|---|---|---|---|---|---|---|---|
| | 0 | input | Input | $X_1 \times Y_1 \times 1$ | - | - | - | - | - | $X_1 \times Y_1 \times 1$ | |
| | 1 | batch norm | BatchNorm1 | $X_1 \times Y_1 \times 1$ | - | - | - | - | - | $X_1 \times Y_1 \times 1$ | |
| | 2 | ELU | EluLayer1 | $X_1 \times Y_1 \times 1$ | - | - | - | - | - | $X_1 \times Y_1 \times 1$ | |
| | 3 | conv | Conv1 | $X_1 \times Y_1 \times 1$ | - | 32 | $K_1 \times 7$ | 1 x 1 | Same | $X_1 \times Y_1 \times 32$ | |
| n times | 4 | RNBM | - | $X_1 \times Y_1 \times 32$ | 1 | 32 | $K_1 \times 7$ | 1 x 1 | - | $X_1 \times Y_1 \times 32$ | |
| | ... | RNBM | - | $X_1 \times Y_1 \times 32$ | 1 | 32 | $K_1 \times 7$ | 1 x 1 | - | $X_1 \times Y_1 \times 32$ | |
| | 4+n−1 | RNBM | - | $X_1 \times Y_1 \times 32$ | 1 | 32 | $K_1 \times 7$ | 1 x 1 | - | $X_1 \times Y_1 \times 32$ | |
| n times | 4+n | RNBI | - | $X_2 \times Y_2 \times 32$ | 2 | 64 | $K_1 \times 7$ | $S_1 \times 2$ | - | $X_2 \times Y_2 \times 64$ | |
| | ... | RNBM | - | $X_2 \times Y_2 \times 64$ | 2 | 64 | $K_1 \times 7$ | 1 x 1 | - | $X_2 \times Y_2 \times 64$ | |
| | 4+2×n-1 | RNBM | - | $X_2 \times Y_2 \times 64$ | 2 | 64 | $K_1 \times 7$ | 1 x 1 | - | $X_2 \times Y_2 \times 64$ | |
| n times | 4+2×n | RNBI | - | $X_3 \times Y_3 \times 64$ | 3 | 128 | $K_1 \times 7$ | $S_1 \times 2$ | - | $X_3 \times Y_3 \times 128$ | |
| | | RNBM | - | $X_3 \times Y_3 \times 128$ | 3 | 128 | $K_1 \times 7$ | 1 x 1 | - | $X_3 \times Y_3 \times 128$ | |
| | 4+3×n-1 | RNBM | - | $X_3 \times Y_3 \times 128$ | 3 | 128 | $K_1 \times 7$ | 1 x 1 | - | $X_3 \times Y_3 \times 128$ | |
| | 4+3×n | dropout | Dropout1 | $X_3 \times Y_3 \times 128$ | - | - | - | - | - | $X_3 \times Y_3 \times 128$ | Dropout rate is 0.5 |
| | 4+3×n+1 | global average pooling | GAP | $X_3 \times Y_3 \times 128$ | - | - | - | - | - | 128 | |
| | 4+3×n+2 | FC | Embedding | 128 | - | - | - | - | - | 100 | |
| | 4+3×n+3 | dropout | Dropout2 | 100 | - | - | - | - | - | 100 | Dropout rate is 0.5 |
| | 4+3×n+4 | FC | Softmax | 100 | - | - | - | - | - | #classes | |
| | 4+3×n+5 | Softmax | SoftmaxLoss | #classes | - | - | - | - | - | 1 | |

1145
Concatenate feature vectors
1110
1115
1120
1125
1130
1135
1140
Statistical feature extraction
Correlation feature extraction
Mel Frequency Cepstral Coefficient feature extraction
Shifted Delta Cepstral feature extraction
Histogram of Oriented Gradients feature extraction
Markov Transition Matrix feature extraction
Convolutional Neural Network embedding
1105
S110

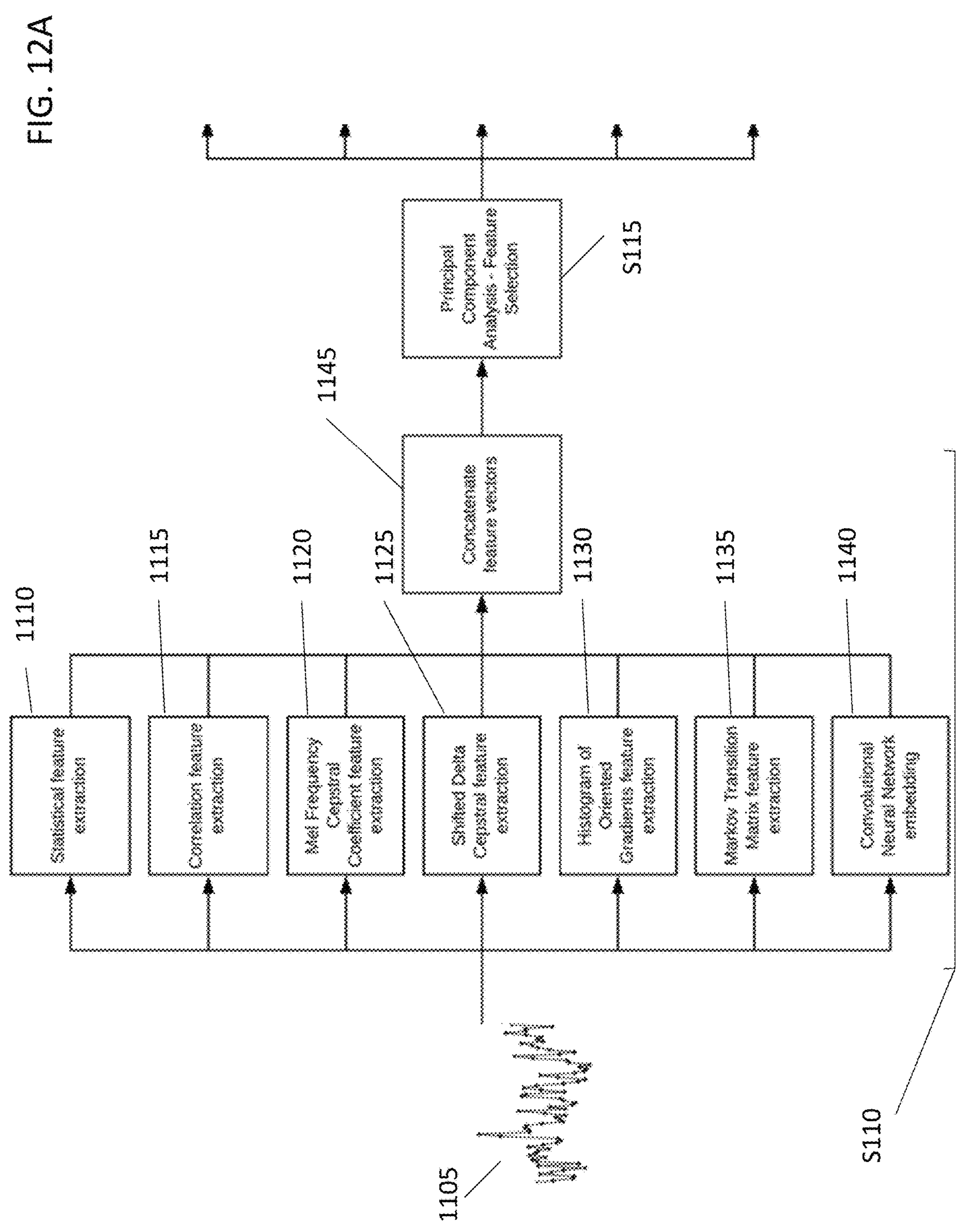

FIG. 12A
1105
1110
Statistical feature extraction
1115
Correlation feature extraction
1120
Mel Frequency Cepstral Coefficient feature extraction
1125
Shifted Delta Cepstral feature extraction
1130
Histogram of Oriented Gradients feature extraction
1135
Markov Transition Matrix feature extraction
1140
Convolutional Neural Network embedding
1145
Concatenate feature vectors
Principal Component Analysis - Feature Selection
S115
S110

S120
S115
Principal Component Analysis - Feature Selection
1305
Naive Bayes Classifier
1310
Support Vector Machine Classifier
1315
Multi-layer perceptron Classifier
1320
Random Forest Classifier
1325
Kernel Ridge Classifier
1330
Concatenate new feature vector - scores and labels
Support Vector Machine Classifier
Yes
No
Genuine
Impostor

Secure IPSEC Tunnel

1402

The Internet
TCP/IP

1401b

1401a

Smartphone

1424

User

SYSTEM AND METHOD FOR USER RECOGNITION USING MOTION SENSOR DATA

CROSS-REFERENCE TO RELATED APPLICATIONS

The present application is based on and claims priority to U.S. Provisional Patent Application Ser. No. 62/644,125 entitled "SYSTEM AND METHOD FOR USER RECOGNITION USING MOTION SENSOR DATA," filed Mar. 16, 2018, and to U.S. Provisional Patent Application Ser. No. 62/652,114 entitled "SYSTEM AND METHOD FOR USER RECOGNITION USING MOTION SENSOR DATA," filed Apr. 3, 2018, both of which are hereby incorporated by reference as if set forth expressly in their respective entireties herein.

TECHNICAL FIELD OF THE INVENTION

The present invention relates to systems and methods for capturing and characterizing motion sensor data. In particular, the present invention relates to systems and methods for capturing motion sensor data using motion sensors embedded in a mobile device and characterizing the motion sensor data into features for user recognition.

BACKGROUND OF THE INVENTION

Nowadays, common mobile device authentication mechanisms such as PINs, graphical passwords, and fingerprint scans offer limited security. These mechanisms are susceptible to guessing (or spoofing in the case of fingerprint scans) and to side channel attacks such as smudge, reflection, and video capture attacks. On top of this, a fundamental limitation of PINs, passwords, and fingerprint scans is that these mechanisms require explicit user interaction. Hence, these mechanisms are typically used for one-time authentication to authenticate users at login. This renders them ineffective in and of themselves when the smartphone is accessed by an adversary user after login.

Continuous authentication (or active authentication) addresses some of these challenges by periodically and unobtrusively authenticating the user via behavioral biometric signals, such as touchscreen interactions, hand movements, gait, voice, phone location, etc. The main advantage of continuous authentication mechanisms is that they do not require explicit user interaction.

One-time or continuous user identity verification (authentication) based on data collected by the motion sensors of a mobile device during the interaction of the user with the respective mobile device is a recently studied problem that emerged after the introduction of motion sensors into commonly used mobile devices. Samsung in 2005 and Apple Inc. in 2007 were among first companies to introduce hand-held mobile devices (smartphones) equipped with a sensor, more specifically an accelerometer, capable of recording motion data.

The earliest studies in continuous authentication of mobile phone users focused on keystroke dynamics, because these devices had a hardware keyboard to interface with the user. The first research article to propose the analysis of accelerometer data in order to recognize the gait of a mobile device user was in 2006. Since 2006, many other research works explored the task of user identity verification (authentication) based on data collected by the motion sensors. One commonly employed approach is to directly measure the similarity between the sample of signal recorded during authentication and previously-recorded sample of signal which is known to pertain to the user. The samples are compared based on statistical features extracted in time domain or frequency domain or both. Other works approach the task of user authentication based on motion sensors data as a classification problem. These works apply a standard machine learning methodology based on two steps: (i) extracting statistical features from the recorded motion signals in time domain or frequency domain or both and (ii) applying a standard machine learning classifier.

However, these methods which use continuous authentication for mobile devices have lower accuracy rates as compared with authentication methods that utilize PINs, passwords, fingerprints, and the like. As such, there is a need for user authentication methods and systems with improved accuracy and flexibility, and that address the issues of guessing, spoofing, and other types of presentation attacks associated with conventional authentication methods. These and other challenges (e.g., presentation attacks) are addressed by the systems and methods of the present application.

SUMMARY OF THE INVENTION

Technologies are presented herein in support of a system and method for user recognition using motion sensor data.

According to a first aspect, a method for user recognition using motion sensor data is provided. The method includes the step of collecting, by a mobile device having at least one motion sensor, a storage medium, instructions stored on the storage medium, and a processor configured by executing the instructions, a motion signal of a user. The method also includes the step of extracting, with the processor applying one or more feature extraction algorithms to the collected motion signal, one or more respective sets of features. A given set of features can include discriminative and non-discriminative features extracted from the motion signal by a given feature extraction algorithm among the one or more feature extraction algorithms. The method further includes the step of selecting, with the processor using a feature selection algorithm, a subset of discriminative features from the one or more respective extracted sets of features. In addition, the method includes the step of classifying, with the processor using a classification algorithm, a user as a genuine user or an imposter user based on a classification score generated by the classification algorithm from an analysis of the subset of discriminative features.

According to at least one aspect, the at least one motion sensor includes an accelerometer and a gyroscope. According to another aspect, the step of collecting the motion signal of the user is performed in a time-window of approximately 2 seconds.

According to another aspect, the step of extracting a set of features from the collected motion signal further includes analyzing, with the processor using a plurality of feature extraction algorithms, the collected motion signal. The plurality of feature extraction algorithms is selected from a group consisting of: (1) a statistical analysis feature extraction technique, (2) a correlation features extraction technique, (3) Mel Frequency Cepstral Coefficients (MFCC), (4) Shifted Delta Cepstral (SDC), (5) Histogram of Oriented Gradients (HOG), (6) Markov Transition Matrix and (7) deep embeddings extracted with Convolutional Neural Networks (CNN). According to a further aspect, the HOG technique employs two gradient orientations. According to a further aspect, the CNN utilizes five independently trained architectures.

According to another aspect, the motion signal corresponds to one or more interactions between the user and the mobile device. According to a further aspect, the one or more interactions can include implicit interactions. According to another aspect, the one or more interactions can be a combination of explicit and implicit interactions.

According to another aspect, the feature selection algorithm comprises a principal component analysis algorithm. The principal component analysis algorithm configures the processor to rank the extracted features based on the level of variability of the feature between users and select the features with the highest levels of variability to form the subset of discriminative features.

According to another aspect, the classification algorithm comprises a stacked generalization technique. The stacked generalization technique utilizes one or more of the following classifiers: (1) Naïve Bayes classifier, (2) Support Vector Machine (SVM) classifier, (3) Multi-layer Perception classifier, (4) Random Forest classifier, (5) and Kernel Ridge Regression (KRR).

According to a second aspect, a system for analyzing a motion signal captured by a mobile device having at least one motion sensor is provided. The system includes a network communication interface, a computer-readable storage medium, and a processor configured to interact with the network communication interface and the computer readable storage medium and execute one or more software modules stored on the storage medium. The one or more software modules can include a feature extraction module that when executed configures the processor to extract one or more respective sets of features from the captured motion signal. The given set of features includes discriminative and non-discriminative features extracted from the captured motion signal by a given feature extraction algorithm of the feature extraction module. The software modules can also include a feature selection module that when executed configures the processor to select a subset of discriminative features from the one or more respective extracted sets of features. The software modules can further include a classification module that when executed configures the processor to classify a user as a genuine user or an imposter user based on a classification score generated by one or more classifiers of the classification module from an analysis of the subset of discriminative features.

In at least one aspect, the feature extraction module when executed configures the processor to extract one or more sets of features by analyzing the captured motion signal using one or more of the following feature extraction algorithms: (1) a statistical analysis feature extraction technique, (2) a correlation features extraction technique, (3) Mel Frequency Cepstral Coefficients (MFCC), (4) Shifted Delta Cepstral (SDC), (5) Histogram of Oriented Gradients (HOG), (6) Markov Transition Matrix, and (7) deep embeddings extracted with Convolutional Neural Networks (CNN).

In another aspect, the feature selection module includes a principal component analysis algorithm that when executed configures the processor to rank the extracted features based on the level of variability of the feature between users and select the features with the highest levels of variability to form the subset of discriminative features.

In another aspect, the classification module when executed configures the processor to classify the subset of discriminative features using a stacked generalization technique. The stacked generalization technique utilizes one or more of the following classifiers: (1) Naïve Bayes classifier, (2) Support Vector Machine (SVM) classifier, (3) Multi-layer Perception classifier, (4) Random Forest classifier, and (5) Kernel Ridge Regression (KRR).

In another aspect, the motion signal corresponds to one or more interactions between the user and the mobile device. In a further aspect, the one or more interactions comprise explicit interactions. In another aspect, the one or more interactions comprise implicit interactions.

These and other aspects, features, and advantages can be appreciated from the accompanying description of certain embodiments of the invention and the accompanying drawing figures and claims.

BRIEF DESCRIPTION OF THE DRAWINGS

FIG. 6 displays a table showing a residual block with maintaining depth dimension (ResNetBlockMaintain-RNBM) in accordance with at least one embodiment herein;

FIG. 7 displays a table showing a residual block with increasing depth dimension (ResNetBlockIncrease-RNBI) in accordance with at least one embodiment herein;

FIG. 8 displays a CNN architecture with residual blocks in accordance with at least one embodiment herein;

FIGS. 12A-12B are block diagrams showing a computation flow for verifying a user based on interaction with a mobile device measured through mobile sensors in accordance with at least one embodiment disclosed herein;

FIG. 13 discloses a high-level diagram of a system for user recognition using motion sensor data in accordance with at least one embodiment disclosed herein;

DETAILED DESCRIPTION OF CERTAIN EMBODIMENTS OF THE INVENTION

Figure 1:
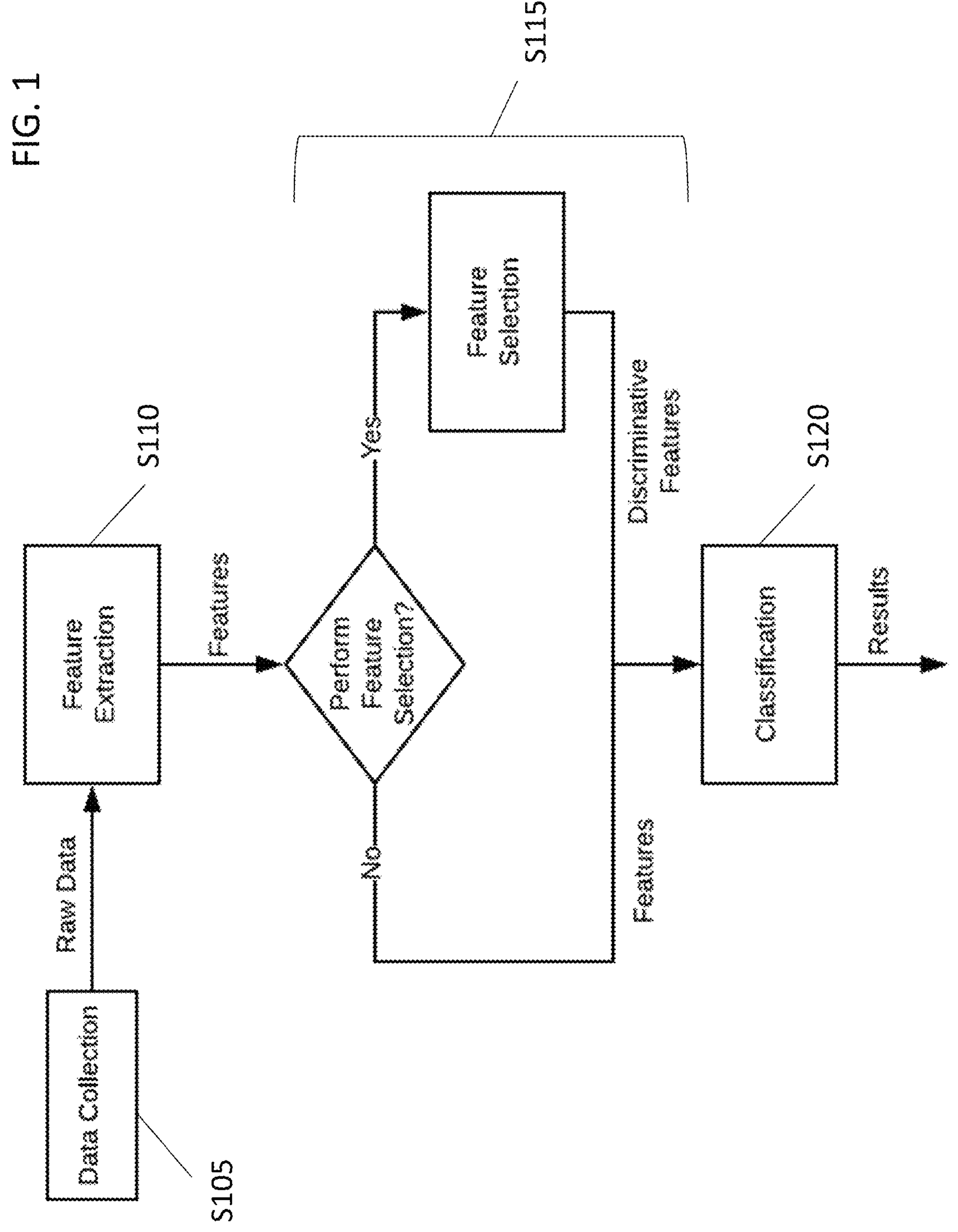
FIG. 1 is a high-level machine learning pipeline for classification, which shows a routine for data collection, feature extraction, feature selection, and classification processes in accordance with at least one embodiment disclosed herein.

Disclosed herein are exemplary systems and methods for one-time or continuous user identity verification (authentication) by analyzing the data collected by the motion sensors (e.g. accelerometer and gyroscope) of a mobile device. Data collection can occur during a specific interaction of the user with the respective mobile device, e.g., during a biometric authentication, or during non-specific interactions. The exemplary systems and methods can be applied for both implicit and explicit interactions. Common approaches for user identification based on data collected using mobile device sensors are based on two steps: (i) extracting statistical features from the recorded signals and (ii) applying a standard machine learning classifier. In some embodiments disclosed herein, the disclosed method is based on three steps. In the first step (feature extraction), along with the commonly used statistical features, the system is configured to extract an extended and unique set of features which are typically used in other signal processing domains. For example, these are: Mel Frequency Cepstral Coefficients (usually applied in voice recognition), Shifted Delta Cepstrum Coefficients (usually applied in voice recognition), Histogram of Oriented Gradients (usually applied in object detection from images), Markov Transition Matrix, and deep embeddings learned with Convolutional Neural Networks (usually applied in computer vision). In the end, the present system is configured to obtain a high-dimensional (e.g., large number of features) feature vector for each one-dimensional (single-axis) sample of a motion signal. All of these features have never been applied for user identification based on mobile device sensors. In the second step (feature selection), the system is configured to apply Principal Component Analysis to reduce the dimension of the feature space (i.e., to reduce the number of features) by keeping the more relevant (discriminative) features. In the third step (classification), the present system is configured to train a meta-classifier that uses as features the classification scores and the labels of several binary (two-class) classifiers (Support Vector Machines, Naïve Bayes, Random Forests, Feed-forward Neural Networks, and Kernel Ridge Regression), as well as the classification scores and the labels of a one-class classifier (one-class Support Vector Machines). Employing a meta-classifier which uses the class labels and the score returned by both one-class and two-class classifiers is an original approach that improves the user identity verification accuracy. The present systems and methods achieve considerably higher accuracy in identifying the user compared to the common approach.

By way of example and for the purpose of overview and introduction, embodiments of the present invention are described below which concern systems and methods for user recognition using motion sensor data. In particular, the present application discloses systems and methods for analyzing user gestures or interactions with a computing device (e.g., mobile device) based on motion sensors on the computing device. This analysis can be performed in a manner that is agnostic to the context of the gesture or interaction (e.g., explicit or implicit interactions). The methods and systems of the present application are based in part on machine learning techniques, which identify characteristics relating to how a user interacts with a mobile device (e.g. movements of the device) using two multi-axis motion sensors—an accelerometer and a gyroscope.

By applying machine learning, the present systems and methods are configured to create and provide a general pipeline for verifying the identity of a person regardless of an explicit context (e.g. signature in air) or implicit context (e.g. phone tapping) of the interaction. For example, the methods and systems disclosed herein are configured to capture user-specific features, such as an involuntary hand shaking specific to the user or a particular way of holding the mobile device in the hand, without being specifically programmed to identify those particular types of features. In other words, the present systems and methods are designed to identify discriminative features in the motion sensor data of the user without regard to the corresponding interactions or gestures that the user is making. As such, the present systems and methods do not require the user to perform a specific gesture in order to verify the identity of the user, but rather can analyze various interactions of the user (implicit or explicit or both) over a time period and identify the user on the basis of discriminative features extracted from the motion signals associated with the interactions and/or gesture(s).

In some implementations, the present system includes a cloud-based system server platform that communicates with fixed PCs, servers, and devices such as laptops, tablets and smartphones operated by users. As the user attempts to access a networked environment that is access controlled (for example, a website which requires a secure login), the user can be authenticated using the user's preregistered mobile device.

The present systems and methods are now described in further detail, along with practical applications of the techniques and other practical scenarios where the systems and methods can be applied for user verification by analyzing the gestures and/or movements captured by mobile motion sensors.

FIG. 1 presents a high-level diagram of a standard machine learning pipeline for classification, which shows a routine for data collection, feature extraction, feature selection, and classification in accordance with at least one embodiment disclosed herein. It should be understood that the exemplary systems and methods for performing user identity verification (authentication) from data collected by mobile device motion sensors, can be implemented using one or more data-processing and computing devices operating independently or in a coordinated fashion. Such computing devices can include for example, mobile devices (e.g., smartphones and tablets), laptops, work-stations and server computers. Exemplary systems and methods for user authentication based on biometrics and other sensor data collected using mobile devices are further described herein and in co-pending and commonly assigned U.S. patent application Ser. No. 15/006,234 entitled SYSTEM AND METHOD FOR GENERATING A BIOMETRIC IDENTIFIER filed on Jan. 26, 2016 and U.S. patent application Ser. No. 14/995,769 entitled "SYSTEM AND METHOD FOR AUTHORIZING ACCESS TO ACCESS-CONTROLLED ENVIRONMENTS" and filed on Jan. 14, 2016, each of which are hereby incorporated by reference as if set forth in their respective entireties herein.

With reference to FIG. 1, the process begins at step S105, where the processor of the mobile device is configured by executing one or more software modules to cause the one or more motion sensors (e.g., accelerometer, gyroscope) of the mobile device to collect (capture) data from the user in the form of one or more motion signals.

One of the problems that the present system is configured to address is a verification problem, and thus the system is configured to find features that are unique for an individual user to be verified. In the context of this problem, a goal is to identify users through their interaction with a device. The interaction, which is defined in a broad sense as a "gesture," is a physical movement, e.g. finger tapping or hand shake, generated by the muscular system. To capture this physical phenomenon, the present system is configured to collect multi-axis signals (motion signals) corresponding to the physical movement of the user during a specified time domain from motion sensors (e.g. accelerometer and gyroscope) of the mobile device. In the present system, the mobile device can be configured to process these signals using a broad and diverse range of feature extraction techniques, as discussed in greater detail below. A goal of the present system is to obtain a rich feature set from motion signals from which the system can select discriminative features.

For example, the accelerometer and the gyroscope can collect motion signals corresponding to the movement, orientation, and acceleration of the mobile device as it is manipulated by the user. The motion sensors can also collect data (motion signals) corresponding to the user's explicit or implicit interactions with or around the mobile device. For example, the motion sensors can collect or capture motion signals corresponding to the user writing their signature in the air (explicit interaction) or the user tapping their phone (implicit interaction). In one or more embodiments, the collection of motion signals by the motion sensors of the mobile device can be performed during one or more predetermined time windows. The time windows are preferably short time windows, such as approximately 2 seconds. For instance, the mobile device can be configured to prompt a user via a user interface of the mobile device to make one or more explicit gestures in front of the motion sensors (e.g., draw the user's signature in the air). In one or more embodiments, the mobile device can be configured to collect (capture) motion signals from the user without prompting the user, such that the collected motion signals represent implicit gestures or interactions of the user with the mobile device.

Again, in contrast with prior systems and methods, the present systems and methods do not require the user to perform a specific gesture in order to verify the identity of the user, but rather can analyze various interactions of the user (implicit or explicit or both) over a period of time and identify the user on the basis of discriminative features extracted from the motion signals associated with those user interactions.

In one or more embodiments, the processor of the mobile device can be configured to examine the collected motion signals and measure the quality of those signals. For example, for an explicit gesture or interaction, motion signals of the user corresponding to the explicit gesture can be measured against sample motion signals for that specific explicit gesture. If the quality of the motion signals collected from the user falls below a predetermined threshold, the user may be prompted via the user interface of the mobile device to repeat the collection step by performing another explicit gesture, for example.

After the collection of the data (motion signals), at step S110 the processor of the mobile device is configured by executing one or more software modules, including preferably the feature extraction module, to apply one or more feature extraction algorithms to the collection motion signal(s). As such, the processor, applying the feature extraction algorithms, is configured to extract one or more respective sets of features from the collected motion signals. The feature extraction module comprises one or more feature extraction algorithms. In one or more implementations, the processor of the mobile device is configured to extract a respective set of features for each of the feature algorithms, where the feature extraction algorithms (techniques) are chosen from the following: (1) a statistical analysis feature extraction technique, (2) a correlation features extraction technique, (3) Mel Frequency Cepstral Coefficients (MFCC), (4) Shifted Delta Cepstral (SDC), (5) Histogram of Oriented Gradients (HOG), (6) Markov Transition Matrix, and (7) deep embeddings extracted with Convolutional Neural Networks (CNN). The one or more feature extraction techniques or algorithms each operate on the same collected motion signals and are independently applied on the collected motion signals. In one or more embodiments, the one more respective set of features extracted from the motion signal(s) includes discriminative and non-discriminative features extracted using one or more of the above feature extraction algorithms.

The processor is configured to run the one or more feature extraction techniques or algorithms in parallel on the same set of collected motion signals. In at least one implementation, all of the above feature extraction techniques are utilized to extract respective sets of features for each technique from the collected motion signals. Thus, in this embodiment, seven respective sets of features are extracted, as each of the seven algorithms is independently applied in parallel on the set of collected motion signals. The implementations of these feature extraction techniques are explained in further detail below.

Feature Extraction

In some embodiments, the mobile device is configured to implement an approach for feature extraction that is based on statistical analysis (statistical analysis feature extraction technique), which tries to characterize the physical process. The statistical approaches that are used in one or more methods of the present application include but are not limited to the following: the mean of the signal, the minimum value of the signal, the maximum value of the signal, the variance of the signal, the length of the signal, the skewness of the signal, the kurtosis of the signal, the $L_2$-norm of the signal, and the quantiles of the distribution of signal values. Methods based on this statistical approach have good performance levels in the context of verifying a person who does the same gesture, e.g. signature in air, at different moments of time. Here, the disclosed embodiments provide a general approach suitable for different practical applications of user verification (authentication) while interacting with a mobile device, such continuous user authentication based on implicit and unconstrained interactions, i.e. multiple and different gestures. Statistical methods such as "G. Bailador, C. Sanchez-Avila, J. Guerra-Casanova, A. de Santos Sierra. Analysis of pattern recognition techniques for in-air signature biometrics. *Pattern Recognition*, vol. 44, no. 10-11, pp. 2468-2478, 2011" and "C. Shen, T. Yu, S. Yuan, S., Y. Li, X. Guan. Performance analysis of motion-sensor behavior for user authentication on smartphones. *Sensors*, vol. 16, no. 3, pp. 345-365, 2016" are generally well-suited for user verification from a specific gesture. In some cases, however, the implementation of only one feature extraction technique, including statistical analysis feature extraction technique, is not discriminative enough on its own to be used in a more general context.

Another set of useful statics can be extracted by analyzing the correlation patterns among the motion signals corresponding to independent axes of the motion sensors (correlation features extraction technique). In one or more embodiments of the present application, to measure the correlation between every pair of motion signals, two correlation coefficients are employed: the Pearson correlation coefficient and the Kendall Tau correlation coefficient. The Pearson correlation coefficient is a measure of the linear correlation between two variables X and Y, in our case two 1D signals. It is computed as the covariance of the two 1D signals divided by the product of their standard deviations. The Kendall Tau correlation coefficient is a statistic used to measure the ordinal association between two measured quantities. It is based on dividing the difference between the number of concordant pairs and the number of discordant pairs by the total number of pairs. A pair of observations are said to be concordant if the ranks for both elements agree (they are in the same order). A pair of observations are said to be discordant if the ranks for the elements disagree (they are not in the same order). It is noted that the Kendall Tau correlation coefficient has never been used to measure the correlation of 1D signals recorded by motion sensors.

Since a user can perform the same interaction (gesture) with a device in slightly different ways, there are unavoidable variations in the interaction. These variations are significant enough to pose a real problem for user verification. To address this issue, the system is configured to implement a variety of signal processing techniques from other technical domains that are specifically adapted to properly address the problem at hand. In some embodiments, the system and methods disclosed herein implement techniques adapted from the audio processing domain, more specifically the speech and voice recognition family of problems, achieving beneficial results that are unexpected. Modern state-of-the-art speaker recognition systems verify users by using short utterances and by applying the i-vector framework, as described in "Kanagasundaram, Ahilan, et al. I-vector based speaker recognition on short utterances. Proceedings of the 12th Annual Conference of the International Speech Communication Association. *International Speech Communication Association* (*ISCA*), 2011.".

The goal of a speaker verification (voice recognition) system is to find discriminative characteristics of the human speech production system so that users can be verified. The system is by nature very flexible allowing production of several variants of neutral speech, as shown in "Kenny, Patrick, et al. A study of interspeaker variability in speaker verification. *IEEE Transactions on Audio, Speech, and Language Processing* 16.5 (2008): 980-988". In the real world, the system also needs to verify the speaker by having access to only limited duration speech data, thus short utterances being a key consideration for development.

By analogy to the speech production (vocal folds) system, with the (upper limb) muscular system involved with gestures, it can be assumed that a user's gesture, performed multiple times in the context of (implicitly) interacting with a mobile device, can have a similar degree of variation as short utterances produced by the vocal folds of a person (user) while pronouncing the same word multiple times. From a real-world perspective, as with the speaker recognition system, the general approach of the disclosed systems and methods preferably are configured to verify interactions than can have a limited duration, e.g., sometimes a gesture being performed by the user in a time window of, say, 2 seconds. In this context, feature extraction methods that are used in a speaker recognition system are adapted for use with the present systems and methods for the purpose of characterizing interactions of a user with the mobile device.

In some embodiments disclosed herein, the exemplary systems and methods implement a technique, which is a feature extraction approach first developed for automatic speech and speaker recognition systems namely, Mel Frequency Cepstral Coefficients (MFCC), which model the human hearing mechanism. MFCC were introduced in early 1980s for speech recognition and then adopted in speaker recognition systems. Even if various alternatives features have been developed, this feature extraction method is difficult to be outperformed in practice. A thorough study on different techniques used in speaker recognition system can be found in "Kinnunen, Tomi, and Haizhou Li. An overview of text-independent speaker recognition: From features to supervectors. *Speech communication*, vol. 52, no. 1: pp. 12-40, 2010."

In the MFCC computation process for speech signals, the speech signal is passed through several triangular filters which are spaced linearly in a perceptual Mel scale. The Mel filter log energy (MFLE) of each filter is calculated. The cepstral coefficients are computed using linear transformations of the log energy filters. These linear transformations are essential for characterizing the voice of a user. These linear transformations can also be used in our approach for characterizing gestures in different contexts, e.g. during implicit interactions. The major reasons for applying linear transformations are: (a) improving robustness of MFLE. The energy filters are susceptible to small changes in signal characteristics due to noise and other unwanted variabilities, (b) decorrelation: the log energy coefficients are highly correlated whereas uncorrelated features are preferred for pattern recognition systems.

From a physiological perspective, when the MFCC technique is used in a speaker recognition system, there is an implicit assumption that the human hearing mechanism is the optimal speaker recognizer. In contrast, in adapting this technique to gesture recognition as disclosed herein for user verification based on interactions with a mobile device, the MFCC technique can operate on an implicit assumption that the motion sensors (accelerometer and gyroscope) represent the optimal interaction recognizer.

In some embodiments of the disclosed method and system, the MFCC technique is tuned using several parameters: sample rate, window length, window shift size, minimum and maximum frequency rate, number of MLFE and so on. The first change that is implemented to adapt this technique to gesture signals captured with the mobile devices is related to the sample rate used to capture an interaction using the accelerometer and gyroscope mobile sensors. In comparison with the sampling rate used for speaker recognition systems, where signals are recorded at a 4, 8, 16 kHz, a standard sample rate used to develop real time mobile applications based on user device interactions is around 100 Hz, for example. Since the sampling rate is three orders of magnitude lower, for example, the features resulting from the motion signals are very different than those resulting from voice signals.

Secondly, the exemplary systems and methods are designed to take into consideration the dynamics of the signals. The voice signals have a high variation in a very short period of time, thus the window length configured to crop the signals and apply the MFCC technique is between 20 and 40 milliseconds. In this time frame the voice signal does not change its characteristics, the cropped signal being statistically stationary. For example, if a voice signal is recorded at a 16 kHz sample rate and the window length is configured to crop the signal with an interval of 25 milliseconds, the time frame on which MFCC is applied on has 400 sample points. In one or more embodiments, the variation of gesture signals is three orders of magnitude lower than the variation of voice signals and the sample rate at which the interaction is recorded as well, 100 Hz in comparison with 16 kHz. As such, the window length is adapted accordingly. For example, and without limitation, values of the window length, for which the cropped signals have presented good performance levels in terms of characterizing the signal properties, range between 1 and 2 seconds. This time frame, for a signal with a sample rate of 100 Hz, corresponds to a cropped signal ranging between 100 and 200 sample points.

The window shift size, which dictates the percentage of overlap between two consecutive windows, is also adapted as well. In the context of voice recorded signals, the window overlap percentage generally has values in the range of 40%-60% in one or more embodiments disclosed herein. For example, in case of a window length of 20 milliseconds used for voice signals, the window shift size is chosen to be 10 milliseconds. This value range is influenced in a certain amount by three factors: (1) sample rate, (2) high variation of voice signals, and also (3) by the practical performance levels. In contrast, signals recorded by the motion sensors during the interaction between a user and a mobile device do not present high variations over short periods of time (compared to the voice signals) and also the sample rate used to capture the gesture is significantly lower than in the case of recorded voice signals. Taking into consideration these two factors and measuring the performance levels in practical experimentation, for the present system, the window overlap percentage for gesture recorded signals has values in the range of 10%-40%.

The other configuration parameters of the MFCC technique have been used with standard values applied to develop speaker and voice recognition systems.

Figure 2:
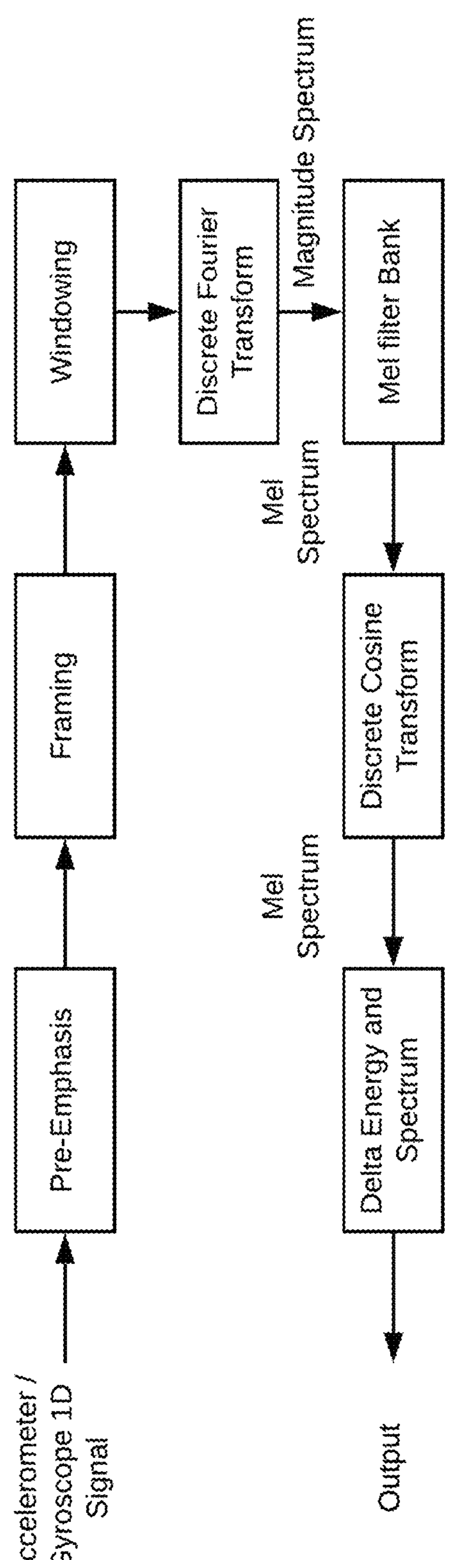
FIG. 2 is a block diagram showing a routine for a MFCC computation process in accordance with at least one embodiment disclosed herein.

FIG. 2 presents the block diagram of the exemplary MFCC computation process in accordance with at least one embodiment disclosed herein. The signal goes through a pre-emphasis filter; then gets sliced into (overlapping) frames and a window function is applied on each frame. Next, a Discrete Fourier Transform is applied on each frame and the power spectrum is computed. This results in a Mel filter bank. To obtain the MFCC, a Discrete Cosine Transform is applied to the filter bank retaining a number of the resulting coefficients while the rest are discarded. Finally, the Delta Energy and the Spectrum are computed.

Another class of features that characterize speech is the prosodic features, which have been studied in "D. R. González, J. R. Calvo de Lara. Speaker verification with shifted delta cepstral features: Its Pseudo-Prosodic Behaviour. In: *Proceedings of I Iberian SLTech,* 2009". Prosodic is a collective term used to describe variations found in human speech recordings, e.g. pitch, loudness, tempo, intonation. In our context, a user can perform the same interaction with a device in slightly different ways, e.g. movement speed, grip, tremor. These variations of a gesture performed by a user can be characterized by using same class of prosodic features.

In some speaker recognition systems, the prosodic features are extracted by using Shifted Delta Cepstral (SDC) technique. In comparison with MFCC, this method is applied on voice signals to incorporate additional temporal information the feature vector. For the present system, since the interaction of a user is recorded by using mobile motion sensors, accelerometer and gyroscope, which record the physical change of the gesture over time, the present systems and methods can be configured to similarly apply SDC techniques in the context of user identification based on sensor data to capture the temporal information.

The SDC technique is configured by a set of 4 parameters, (N, d, P, k,), where:

- N—number of cepstral coefficients computed at each frame;
- d—time advance and delay for the delta computation;
- P—time shift between consecutive blocks; and
- k—number of blocks whose delta coefficients are concatenated to form the final feature vector.

In an exemplary approach to SDC feature extraction disclosed herein, the system can be configured to use SDC with the (N, d, P, k) parameter configuration (7, 1, 3, 7).

Figure 3:
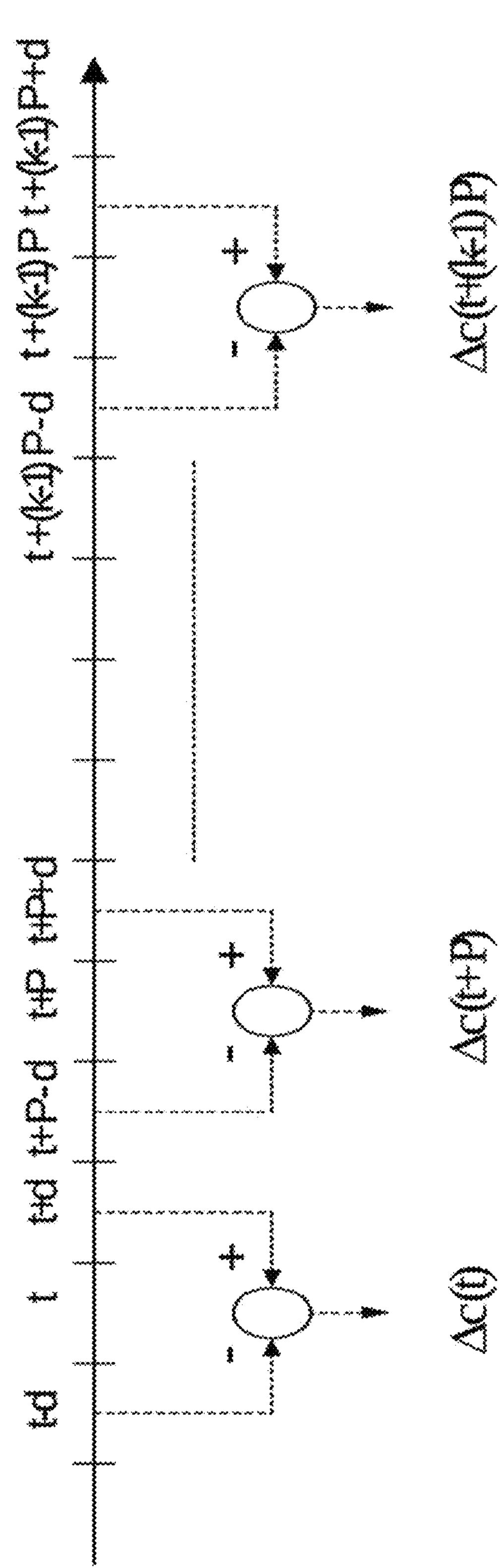
FIG. 3 is a diagram depicting a computation of SDC feature vector at frame N for parameters N-d-P-k in accordance with at least one embodiment disclosed herein.

FIG. 3 presents an exemplary computation of the SDC feature vector at a frame N in accordance with at least one embodiment disclosed herein. First, an N-dimensional cepstral feature vector is computed in each frame t of the signal. Next, each coefficient c is subtracted using spaced td frames to obtain the delta features. Finally, k different delta features, spaced at P frames apart, are stacked to form a SDC feature vector for each frame. The SDC vector at frame t is given by the concatenation from i=0 to k−1 blocks of all the $\Delta c(t+iP)$.

As shown in FIG. 1 and noted above, subsequent to the steps for feature extraction, the system can be further configured to perform steps for user identification based on data collected using mobile device sensors. In particular, as shown in FIG. 1 the system can be configured to perform the operation of feature selection (step S115), for instance, using Principal Component Analysis, so as to identify the discriminative feature information resulting from extraction. Furthermore, the system can then perform classification of the so processed data (step S120). For instance, classification can be performed using a meta-classifier that uses as features the classification scores and labels of several binary (two-class) classifiers (Support Vector Machines, Naïve Bayes, Random Forrest, Feed-forward Neural Networks, Kernel Ridge Regression) and a one-class classifier (one-class Support Vector Machines).

Another goal of the approach as disclosed herein is to verify a user based on his or her interaction with a mobile device by using the device sensors to record the interaction. Up until now, the present disclosure has discussed the term "interaction" in a general sense. A "user interaction" as used in the systems and methods disclosed herein can be defined as: (1) in a one-time interaction context, e.g., a tap on the touchscreen, or (2) in a continuous verification context, e.g. a sequence of multiple and distinctive gestures, such as a tap on the touchscreen followed by a slide gesture on the touchscreen and a handshake. Furthermore, depending on the one-time verification process, a user can also perform a sequence of multiple and distinctive gestures with a device, for instance when the verification of a user is done by using multiple steps, such as biometric authentication followed by SMS code verification. Thus, a user interaction is defined as being composed of a sequence of one or multiple consecutive interactions with the mobile device measured by sensors e.g., accelerometer, gyroscope. The consecutive and typically shorter interactions that form a single interaction are called "local interactions."

Analyzing the interactions of the same user in different contexts, the inventors have determined that a local interaction can be described by the variation of the measured signal during a period of time, e.g., one second for tapping. The signal variation can be characterized in terms of distribution of movement intensity or direction. The three feature extraction methods described above (statistical features, MFCC, SDC) are agnostic to the definition of interaction described above. Therefore, the systems and methods described herein utilize other domains in order to take into account this specific definition of interaction.

In accordance with at least one embodiment described herein, a feature extraction method that can be used to describe the dynamics of the "user interaction" is the histogram of oriented gradients (HOG), which it is used as a standard technique for object recognition systems in the computer vision field. The idea behind HOG is that local object appearance and shape within an image can be described by the distribution of intensity gradients or edge directions. To make an analogy, the local shape of an object can be viewed as a local interaction during a user verification session, where the intensity and direction can be used to describe the shape of the signal variation during the local interaction.

The HOG feature descriptor also presents a number of advantages, in comparison with other feature descriptors, those being: (1) invariant to some geometric transformations (e.g., translations) and (2) invariant to photometric transformations (e.g. noise, small distortions), except for object orientation. More details, comparisons with other descriptors and properties of the technique can be found in the study "N. Dalal, T. Bill. Histograms of oriented gradients for human detection. *Computer Vision and Pattern Recognition*, vol. 1, pp. 886-893, 2005". When the HOG feature descriptor is used to describe the signal corresponding to a local interaction, its properties come in handy. Being invariant to noise transformations, the HOG descriptor can encode the generic trend of the local signal, while removing small noise variations that are introduced by sensors or by the user's hand tremor. The fact that HOG is not invariant to object orientations—in the case of the present systems and methods, the generic trend of the signal—is helpful. For example, if a user has higher intensity changes in the beginning of the motion signal recorded during a finger tap, it is preferable not to use a descriptor that provides the same encoding for a different signal with higher intensity changes near the end. In accordance with at least one embodiment described herein, the general processing flow for applying HOG as a feature descriptor on an image is:

- Calculate the horizontal and vertical gradients of the image. The gradients are generally computed using 2D filters, e.g. Sobel filters.
- Divide the image into cells of p×p pixels. The standard cell size is of 8×8 pixels.
- For each cell, calculate the intensity and orientation of the gradient in each pixel in the cell.
- For each cell, the orientation values are quantized into a n-bin histogram. The typical choice for n is 8 or 9.
- The next step is block normalization using a block size of m×m adjacent cells. The blocks are usually formed of 2×2 cells.
- For each block, the histograms of the corresponding cells are concatenated.
- For each block, calculate the $L_2$-norm of the concatenated histograms.
- The HOG descriptor is obtained by concatenating all blocks into one vector.

Figure 4:
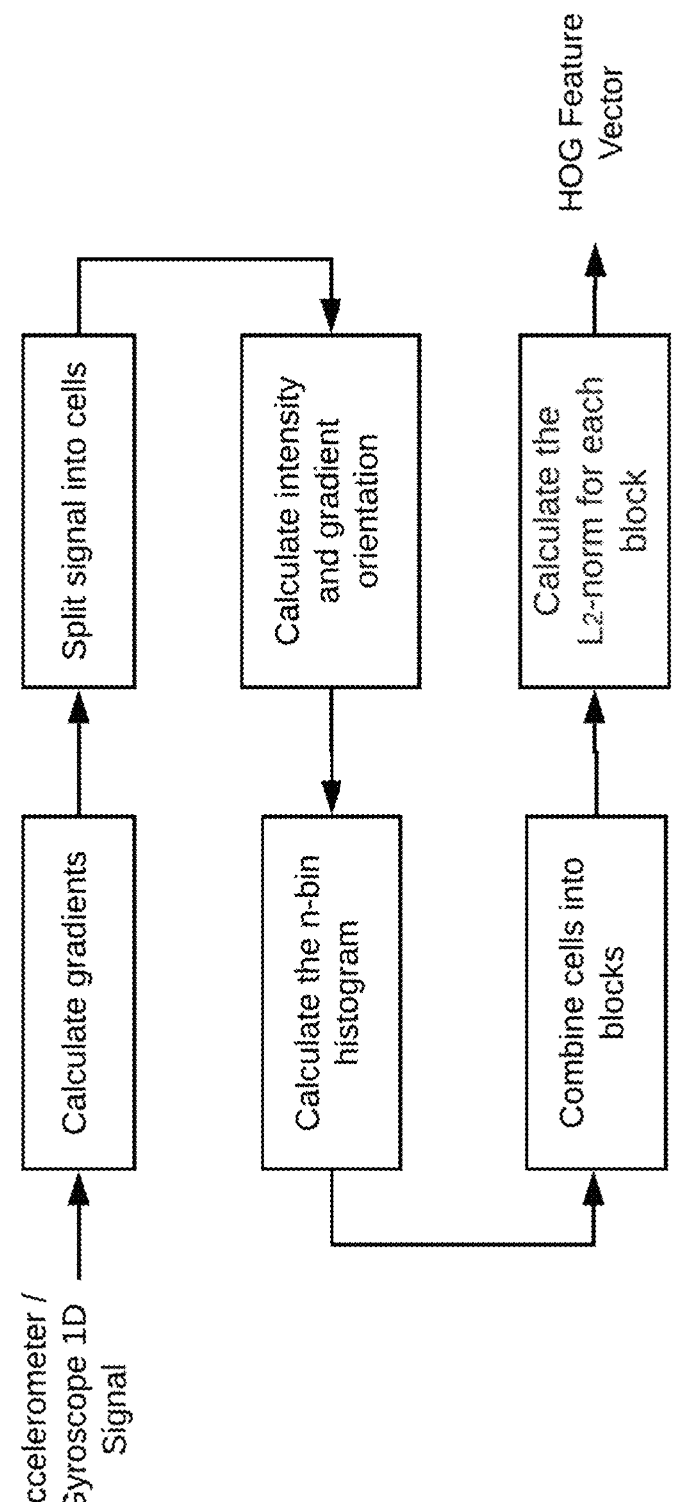
FIG. 4 is a block diagram showing a computation flow of HOG feature vector applied on a generic motion detect signal in accordance with at least one embodiment disclosed herein.

FIG. 4 presents the processing flow of HOG feature extraction technique for one-dimension (single-axis) motion signals in accordance with at least one embodiment described herein.

In order to apply the HOG descriptor on time-domain signals recorded by motion sensors, the HOG approach is adapted from two-dimensional (2D) discrete signals (images) to one-dimensional (1D) discrete motion signals. It is noted that a 1D motion signal is used for the time axis of the motion sensors. In accordance with one or more embodiments disclosed herein, the present systems and methods make the following changes to the HOG approach in order to use it on motion signals:

- A 2D cell used in the image domain corresponds to a short 1D timeframe of the one-dimension signal, with the size of p elements, not p×p pixels.
- In the motion signal domain, a block is a group of m adjacent timeframes instead of m×m adjacent cells (as in the image domain).
- Gradients of the 1D signal (motion signal) are calculated only in one direction given by time axis, different from the image domain, in which gradients are computed in the two spatial directions (horizontal and vertical) of the image.
- For gradient calculation, a 1D filter is applied instead of two (vertical and horizontal) 2D filters. The resulted gradient vector is the first derivate of the 1D motion signal.

For an image domain, HOG is usually based on 8 or 9 gradient orientations. In contrast the HOG version adapted for the signal domain in the present systems and methods uses only two (2) gradient orientations. As described above, the present systems and methods employs multiple changes to HOG techniques to adapt the HOG feature extraction technique for motion signals.

One study that has applied HOG as feature extraction method in time-series classification is "J. Zhao, L. Itti. Classifying time series using local descriptors with hybrid sampling. *IEEE Transactions on Knowledge and Data Engineering* 28, no. 3, pp. 623-637, 2017". Regarding this study, it should be noted that it presents an algorithm used for general time-series classification problem, not the usage of HOG in time-series classification. To our knowledge, HOG has not been applied as a feature extraction method in the context of user behavior verification.

The feature extraction methods described above characterize the interaction process of a user with a mobile device from two perspectives: (1) using statistical analysis and (2) signal processing. Both perspectives are based on interpreting the interaction process (e.g. movement) as a deterministic process, in which no randomness is involved in the evolution of the interaction. However, an interaction is not necessarily a deterministic process. For example, depending on the speed movement of a gesture at a certain moment of time t during the interaction, the user can accelerate or decelerate the movement at time t+1, e.g. putting the phone down on the table. Hence, it is more natural to take into consideration that the interaction process can be modeled as a stochastic process.

Based on this interpretation of the physical interaction process, in at least one embodiment described herein, the present systems and methods can characterize stochastic processes using discrete states. In this context, a discrete state is defined as a short interval in the amplitude of the signal. The model considered to be a good fit for describing the interaction is the Markov Chain process. The idea behind this modelling technique is to characterize changes between system's states as transitions. The model associates a probability for each possible transition from the current state to a future state. The probability values are stored in a probability transition matrix, which is termed as the Markov Transition Matrix. The transition matrix can naturally be interpreted as a finite state machine. By applying the Markov Chain process model in the context of the present systems and methods, the information given by the transition matrix can be used as features characterizing the stochastic component of the interaction process with a mobile device. More information regarding the Markov Chain process can be found in the study "S. Karlin. A first course in stochastic processes. *Academic press*, pp. 27-60, 2014".

To calculate the Markov Transition Matrix, a transformation technique is applied to convert the discrete signals, resulted from the measurements of the mobile sensors, into a finite-state machine. In one or more embodiments, the conversion process is based on the following steps:

- Configure the number of discrete states q of the finite-state machine.
- For each discrete signal divide the amplitude into q quantiles.
- Set the range between each two consecutive quantiles as a discrete state.
- For each amplitude value of the signal, associate the state that corresponds to the respective value, i.e. if the amplitude value fits in the corresponding range.
- The corresponding states for each amplitude value are recorded in a state vector, keeping the temporal order of the signal readings provided by the motion sensors.
- The state vector is used to build the q×q Markov Transition Matrix by counting the changes between consecutive states.
- Each row in the Markov Transition Matrix is normalized to transform the count values into probabilities.
- The final feature vector is obtained by linearizing the Markov Transition Matrix.

For configuring the number of quantiles, no best practice or standard used in the research community was found, this value being dependent on the application and the shape of the signals. In one or more embodiments of the systems and methods described herein, it has been determined that a value of 16 states is a good choice for motion signals recorded by motion sensors. This value has been determined through experiments, starting from 2 quantiles up to 64, using powers of 2 as possible values. After transforming the discrete motion signal into a finite-state machine, the Markov Chain model algorithm has been applied to create the probability transition matrix.

Each of the features described so far are obtained through an engineered process that encapsulates knowledge and intuition gained in the field of machine learning and related fields of study. However, computer vision researchers have found that a different paradigm, in which features are not engineered but automatically learned from data into an end-to-end fashion, provides much better performance in object recognition from images and related tasks. Indeed, this paradigm, known as deep learning, has been widely adopted by the computer vision community in the recent years, due to their success in recognizing objects, as illustrated in "A. Krizhevsky, I. Sutskever, G. E. Hinton. ImageNet Classification with Deep Convolutional Neural Networks. Proceedings of NIPS, pp. 1106-1114, 2012." and in "K. He, X. Zhang, S. Ren, J. Sun. Deep Residual Learning for Image Recognition. In Proceedings of CVPR, pp. 770-778, 2016."

The state-of-the-art approach in computer vision is represented by deep convolutional neural networks (CNN). Convolutional neural networks are a particular type of feed-forward neural networks that are designed to efficiently process images through the use of a special kind of layer inspired by the human visual cortex, namely the convolutional layer. The information through the network moves in only one direction, from the input layer, through the hidden layers and to the output layers, without forming any cycles. Convolutional neural networks for multi-class image classification (a task also known as object recognition in images) are typically trained by using Stochastic Gradient Descent (SGD) or other variants of the Gradient Descent algorithm in order to minimize a loss function. The training process is based on alternating two steps, a forward pass and backward pass, until the model's prediction error is sufficiently low. The forward pass consists of passing the training data through the model in order to predict the class labels. In the backward pass, the error given by the current predictions is used to update the model in order to improve the model and reduce its error. In order to update the model's weights, the errors are back-propagated through the network using the back-propagation algorithm described in "D. E. Rumelhart, G. E. Hinton, R. J. Williams. Learning representations by back-propagating error. Nature, vol. 323, no. 9, pp. 533-536, 1986".

After several iterations (epochs) over the training data, the algorithm is supposed to find the model's weights that minimize the prediction error on the training set. This is done by making small adjustments to the model's weights that move it along the gradient (slope) of the loss function down towards a minimum error value. If the loss function is non-convex, which is usually the case, the algorithm will only find a local minimum of the loss function. However, there are many practical tricks that help the network in avoiding local minima solutions. For example, one approach is to split the training set into small batches, called mini-batches, and execute the forward and backward steps on each mini-batch. As each and every mini-batch contains a different subset of training samples, the gradient directions will be different each time. Eventually, this variation can help the algorithm to escape local minima.

Convolutional neural networks have a specific architecture inspired by the human visual cortex, a resemblance that is confirmed by "S. Dehaene. Reading in the brain: The new science of how we read. Penguin, 2009". In the former layers (closer to the input), the CNN model learns to detect low-level visual features such as edges, corners and contours. In the latter layers (closer to the output), these low-level features are combined into high-level features that resemble object parts such as car wheels, bird beaks, human legs, and so on. Hence, the model learns a hierarchy of features that helps to recognize objects in images. Such low-level or high-level features are encoded by convolutional filters that are automatically learned from data. The filters are organized into layers known as convolutional layers.

To use convolutional neural networks on a different data type (motion signals instead of images) in the present system and method, an input image is built from the motion signals recorded by the mobile device motion sensors. The present system adopts two strategies. The first strategy is to stack the recorded signals (represented as row vectors) vertically and obtain a matrix in which the number of rows coincides with the number of signals. For instance, in an embodiment in which there are 3-axis recordings of the accelerometer and the gyroscope sensors, then the corresponding matrix has 6 rows. The second strategy is based on stacking the recorded signals for multiple times, such that every two signals can be seen together in a vertical window of 2 rows. To generate the order in which the signals should be stacked, a de Bruijn sequence is used, as described in "N. G. de Bruijn, Acknowledgement of Priority to C. Flye Sainte-Marie on the counting of circular arrangements of 2n zeros and ones that show each n-letter word exactly once. T. H.-Report 75-WSK-06. Technological University Eindhoven, 1975". The second strategy aims to ensure that the convolutional filters from the first convolutional layer can learn correlations between every possible pair of signals. For instance, in an embodiment in which there are 3-axis recordings of the accelerometer and the gyroscope sensors, then the corresponding matrix has 36 rows. For both strategies, the input signals are resampled to fixed length for each and every input example. The resampling is based on bilinear interpolation.

Figure 5:
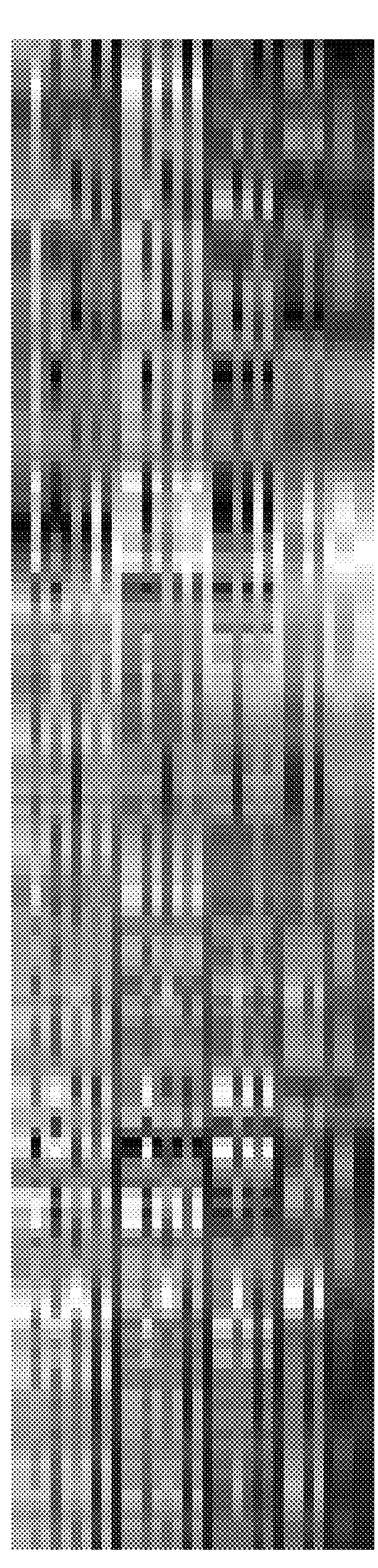
FIG. 5 displays an exemplary input image for convolutional neural networks constructed from motion signals recorded by two 3-axis mobile device sensors (accelerometer and gyroscope) in accordance with at least one embodiment herein.

FIG. 5 illustrates an exemplary input image constructed by applying the second strategy of generating examples for the convolutional neural networks.

Most CNN architectures used in computer vision are based on several convolutional-transfer-pooling blocks followed by a few fully-connected (standard) layers and the softmax classification layer. Our CNN architecture is based on the same structure. The architecture described in "K. He, X. Zhang, S. Ren, J. Sun. Deep Residual Learning for Image Recognition. In Proceedings of CVPR, pp. 770-778, 2016" diverges from this approach by adding residual connections between blocks and by using batch normalization. A similar CNN architecture is adopted in the present method, which includes residual connects and batch normalization. Two types of blocks with residual connections are used, one that keeps the number filters (example depicted in FIG. 6) and one that doubles the number of filters (example depicted in FIG. 7). In both cases, the Exponential Linear Unit (ELU) transfer function and average pooling are used.

FIG. 8 presents an example generic architecture of the convolutional neural networks with residual connections in accordance with one or more embodiments. From this generic CNN architecture, 5 particular CNN architectures are derived that have slight variations, e.g. different kernel shapes (3×7 or 6×7), strides (3×2 or 2×2), number of residual blocks (from 3 to 5). Despite these variations, all CNN architectures are trained on multi-class motion signal classification task, using the classical softmax loss. Each network is trained on mini-batches of 80 examples for 50-100 epochs, using a learning rate of 0.005. The chosen optimization algorithm is SGD with momentum set to 0.9. After the training process is finished, the last three layers named Dropout2, Softmax and SoftmaxLoss are removed. The output of the last remaining layer (a fully-connected layer with 100 neurons named Embedding) is then used as a feature vector that is automatically learned from the input motion signals. Given that 5 CNN models are independently trained, a total of 500 deep features are obtained. These features can also be interpreted as an embedding of the motion signals into a 500-dimensional vector space, in which the users can be classified more easily.

To recap the feature extraction techniques of the present systems and methods disclosed herein, a broad diversity of techniques have been applied, ranging from standard techniques used for analyzing time-series, e.g., (1) statistical features and (2) correlation features, to feature extraction methods adapted from the speaker and voice recognition domain, e.g. (3) Mel Frequency Cepstral Coefficients and (4) Shifted Delta Cepstral, and feature extraction methods adapted from the computer vision domain, e.g. (5) Histogram of Oriented Gradients and (6) deep embeddings extracted with Convolutional Neural Networks. A feature extraction method adapted from stochastic process analysis has also been applied, namely the (7) Markov Transition Matrix. Different from standard methods, another important and distinctive feature of the system and method disclosed herein is the use of such a broad and diverse set of features. To our knowledge, there are no methods or systems that incorporate such a broad set of features. A challenge in incorporating so many different features is to be able to effectively train a classification model with only a few examples, e.g. 10-100, per user. First, the feature values are in different ranges, which can negatively impact the classifier. To solve this problem, the present system independently normalizes each set of features listed above. Secondly, there are far more features (thousands) than the number of examples, and even a simple linear model can output multiple solutions that fit the data. To prevent this problem, the present system applies a feature selection technique, Principal Component Analysis, before the classification stage, as discussed in further detail below.

It should be noted that, in one or more embodiments disclosed herein, every feature extraction method is applied on the entire signal, in order to characterize the global features of the signals, and also on shorter timeframes of the signals, in order to characterize the local patterns in the signal. Depending on the feature set, two approaches are used for extracting shorter timeframes from the signal. One approach is based on recursively dividing the signal into bins, which generates a pyramid representation of the signal. In the first level of the pyramid, one bin that spans the entire signal is used. In the second level of the pyramid, the signal is divided into two bins. In the third level of the pyramid, each bin is divided from the second level into two other bins, resulting in a total of 4 bins. In the fourth level of the pyramid, the divisive process continues and 8 bins are obtained. This approach can be visualized using a pyramid representation with four levels, with 1, 2, 4, and 8 bins on each level, respectively. This process is inspired by the spatial pyramid representation presented in "S. Lazebnik, C. Schmid, J. Ponce. Beyond Bags of Features: Spatial Pyramid Matching for Recognizing Natural Scene Categories. In: *Proceedings of IEEE Conference on Computer Vision and Pattern Recognition*, vol. 2, pp. 2169-2178, 2006", which is commonly used in computer vision to recover spatial information in the bag-of-visual-words model, as illustrated in the paper "R. T. Ionescu, M. Popescu, C. Grozea. Local Learning to Improve Bag of Visual Words Model for Facial Expression Recognition. In *Proceedings of Workshop on Challenges in Representation Learning, ICML,* 2013". The pyramid representation is used to extract statistical features, correlation features and Markov Transition Matrix features. On the other hand, a different approach is employed for computing shorter timeframes when the MFCC and SDC techniques are used to extract features. This approach is also inspired from the computer vision field, more specifically by the common sliding window approach used in object detection, which is presented in "C. Papageorgiou, T. Poggio. A trainable system for object detection. *International Journal of Computer Vision*, vol. 38, no. 1, pp. 15-33, 2000". Instead of sliding a 2D window over an image, a 1D window is slid over the motion signal. For each window, the MFCC and the SDC features are extracted. In the sliding window approach, the windows can have significant amount of overlap. In at least one embodiment described herein, the overlap allows one to employ multiple and larger windows, which are necessary for the MFCC and SDC processing steps. Different from the sliding window approach, it is noted that the pyramid representation generates disjointed (non-overlapping) bins. Finally, it should be noted that the spatial pyramid representation or the sliding window algorithm has never been used in related art on biometric user authentication based on motion sensors.

Figure 9:
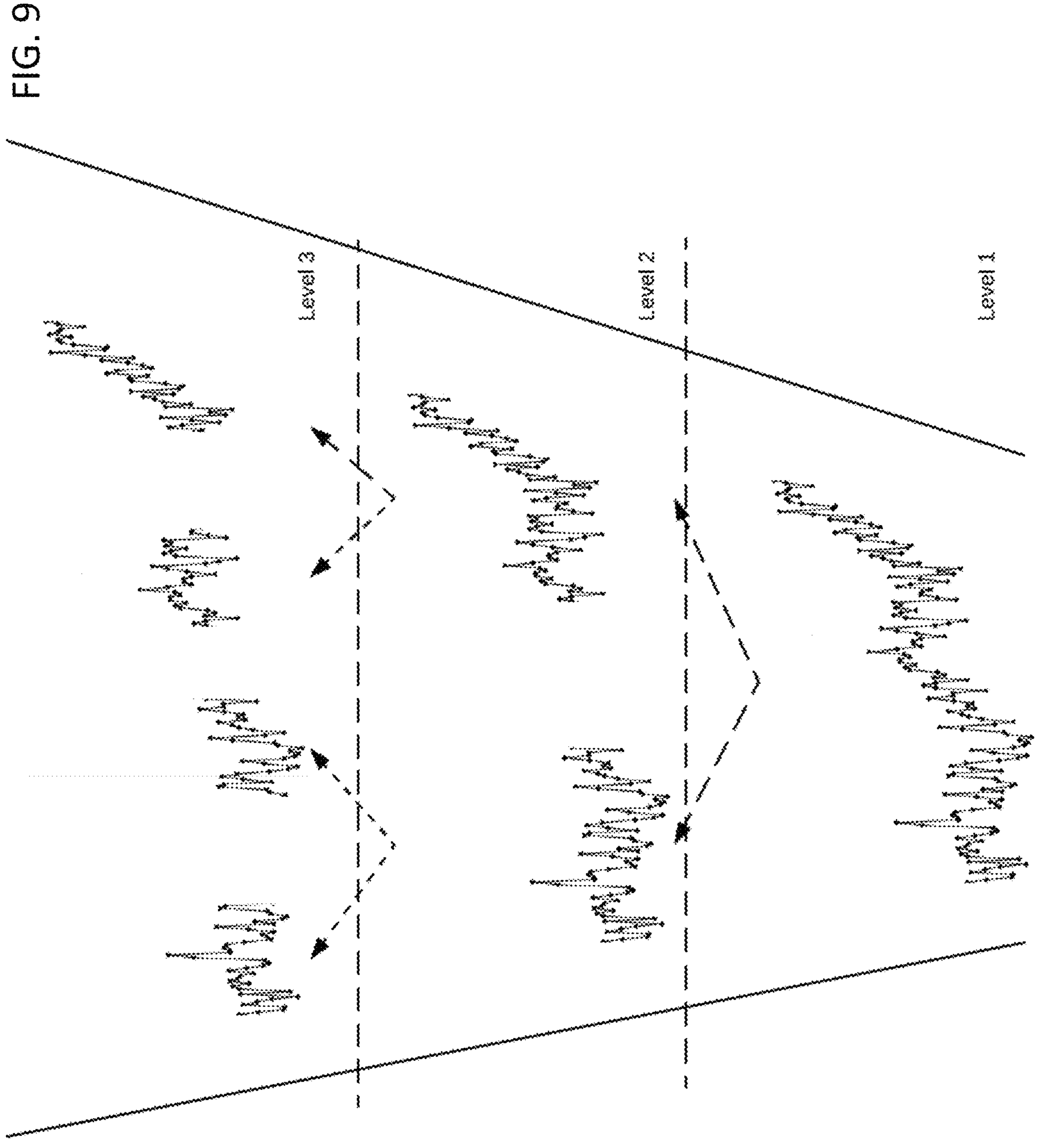
FIG. 9 is a diagram depicting a spatial pyramid technique applied on two-dimensional signal in accordance with at least one embodiment disclosed herein.
Figure 10:
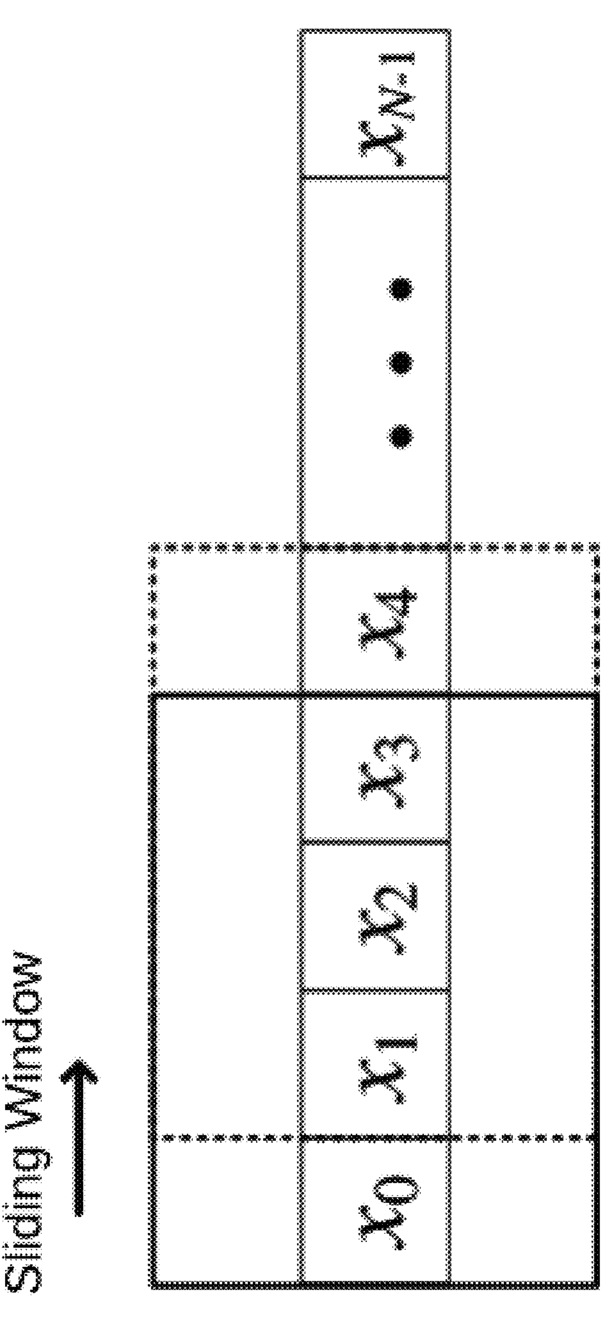
FIG. 10 is a diagram depicting a sliding window in accordance with at least one embodiment disclosed herein.

FIG. 9 displays an exemplary spatial pyramid technique applied to on a 2D signal and FIG. 10 displays an exemplary sliding window, in accordance with one or more embodiments described herein.

Figure 11:
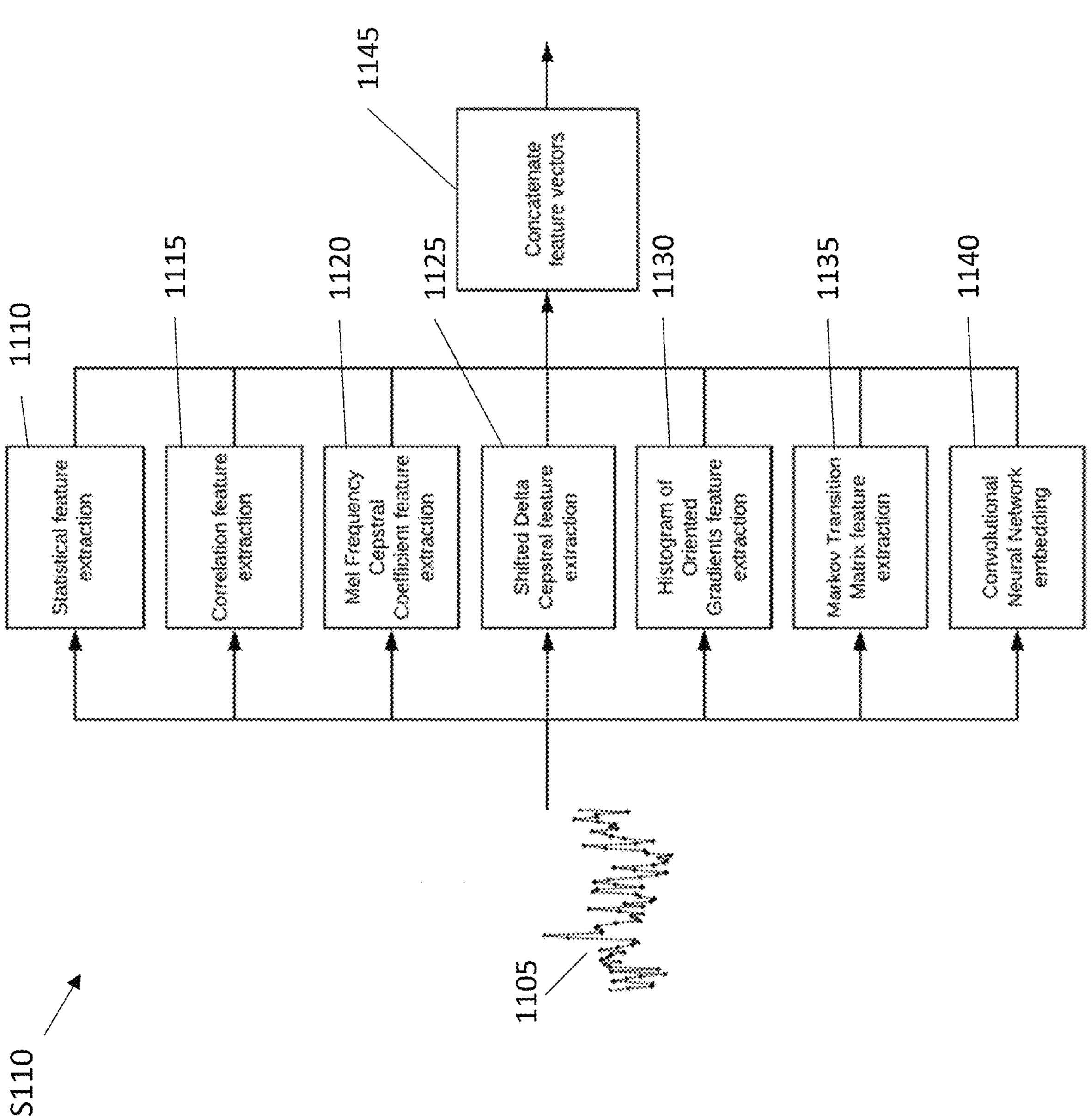
FIG. 11 is a block diagram showing a computation flow of a feature extraction method in accordance with at least one embodiment disclosed herein.

FIG. 11 presents the computation flow of the feature extraction step (S110) of the present method of verifying a user based on the interaction with a device by measuring it with mobile sensors, e.g. accelerometer and gyroscope, in accordance with one or more embodiments described herein. As shown in FIG. 11, in step S110 of the present method, the processor of the mobile device is configured by executing one or more software modules, including one or more feature extraction algorithms, to extract a one respective set of features from the collected motion signal(s) 1105. A given set of features can include discriminative and non-discriminative features extracted from the motion signal 1105 by a given feature extraction algorithm among the one or more algorithms. To extract the respective sets of features, the processor analyzes the motion signals using the one or more feature extraction algorithms, which are chosen from the following: statistical feature extraction technique 1110, correlation features extraction technique 1115, Mel Frequency Cepstral Coefficients (MFCC) 1120, Shifted Delta Cepstral (SDC) 1125, Histogram of Oriented Gradients (HOG) 1130, Markov Transition Matrix 1135 and deep embeddings extracted with Convolutional Neural Networks (CNN) 1140. The respective sets of features extracted from the collected motion signals can be in the form of concatenated feature vectors 1145. The processor can then be configured to select one or more subsets of features (features vectors 1145) from the respective sets of features as explained in further detail below.

Feature Selection

It is noted that the present systems and methods, at least in part, address the general problem of user verification based on the motion patterns recorded during a generic interaction with a mobile device. Accordingly, the present systems and methods use a general approach for verifying the user, which is independent of the verification context: explicit, implicit, one-time verification or continuous verification. The interaction is also defined as being composed of one or more different gestures, depending on the context. The types of gestures performed by the user and measured with the mobile phone sensors are not constrained and can vary in multiple ways. Therefore, the approaches of the present systems and methods have a high level of flexibility in characterizing the interaction of a user using the mobile device. For this reason, an extended set of features (feature vectors 1145, FIG. 11) are extracted that contains discriminative features for various types of gestures and hand movements. More precisely, it is noted that each feature extraction technique can provide a different type of information about the recorded signal, e.g. statistical information or frequency information. In a scenario where an interaction is composed of more than one gesture, the applied feature techniques will not have the same importance in characterizing each type of gesture. A gesture, in this case, can be characterized better by a combination of features which is a subset of the entire set of features, and this combination of features may not necessarily work best for another gesture.

To adapt the features of the present systems and methods for a more specific set of interactions, e.g. implicit one-time verification, a feature selection algorithm is employed. Specifically, referring again to FIG. 1, at step S115 the processor of the mobile device is configured by executing one or more software modules, including preferably a feature selection module, to select a subset of discriminative features from the set of extracted features of the user. In one or more embodiments, the feature selection module employs the feature selection algorithm. The role of the feature selection algorithm is to select the most representative features that characterize a specific set of interactions composed of multiple gesture and, in the same time, the most discriminative features used for verifying the actual user against different impersonators whom are replicating the interaction. In one or more embodiments of the present systems and methods, the technique that is incorporated in the feature selection algorithm is Principal Component Analysis (PCA), a feature selection approach used in the field of machine learning.

Principal Component Analysis performs dimensionality reduction by finding a projection matrix which embeds the original feature space, where the feature vectors reside, into a new feature space with less dimensions. The PCA algorithm has two properties that assist with the subsequent classification step: (1) the calculated dimensions are orthogonal and (2) the dimensions selected by the algorithm are ranked according to the variance of the original features, in descending order. The orthogonal property assures that the dimensions of the embedded feature space are independent of each other. For example, if in the original space the features have high covariance, meaning that the calculated features are correlated, then the system employs the algorithm to calculate the dimensions so that the features projected in the new space can be represented as a linear combination. Thus, the system, by way of the feature selection algorithm, eliminates any correlation between the features, e.g. one feature X will not influence another feature Y in the new space. The ranking according to the variance assures that the dimensions of the new space are the ones that can best describe the original data. The information quantity projected into the new space, measured in terms of variance, can vary depending on the number of dimensions selected to be calculated by the PCA algorithm. Thus, the number of dimensions has a direct influence on the quantity of information preserved in the new projected space. The second property allows one to find the number of dimensions that provides the most representative and discriminative features. This value has been determined through experimental runs, by starting from 50 dimensions, up to 300 dimensions, with a step of 50. The best results obtained are in the range of 100 to 250 dimensions, depending on the context of the interaction. In one or more embodiments, the number of dimensions that gives good results captures about 80% of the variability in the original space. The analysis denotes the fact the rest of 20% is provided by redundant features which are eliminated by PCA.

As such, in one or more embodiments, in the step of feature selection (S115) the processor of the mobile device is configured by executing the feature selection module to rank the extracted features based on the level of variability between users and to select the feature with the highest levels of variability to form the subset of discriminative features. A small and diverse (orthogonal) set of features with high variance can make the classification task less complex, i.e., the classifier selects the optimal weights for a smaller set of features, those that are more discriminative for the task at hand. The discriminative features are selected after combining each kind of features into a single set of features. In other words, PCA is not applied independently on each set of features from the respective feature extraction algorithms, but rather it is applied on a single set of features that are made by combining the features from each feature extraction algorithm.

Classification

With continued reference to FIG. 1, at step S120 the processor of the mobile device is configured by executing one or more software modules, including preferably a classification module (classification algorithm(s)), to classify the user as a genuine user or an imposter user based on a classification score generated by the classification algorithm(s) (i.e., classifiers) from an analysis of the subset of discriminative features. In one or more embodiments, for step S120 an ensemble learning approach is used by combining different types of classifiers.

The technique used in certain biometric verification approaches is a meta-learning method known as stacked generalization. Stacked generalization (or stacking), as introduced in "D. H. Wolpert. Stacked generalization. *Neural Networks*, vol. 5, pp. 241-259, 1992", is based on training a number of base learners (classifiers) on the same data set of samples. The outputs of base classifiers are subsequently being used for a higher-level learning problem, building a meta-learner that links the outcomes of the base learners to the target label. The meta-learner then produces the final target outcome. The method has been proven to be effective for many machine learning problems, especially in the case when the combined base learners are sufficiently different from each other and make distinct kinds of errors. Meta-learning aims to reduce the overall error by eliminating the specific errors of the individual (base) classifiers.

Due to the high level of generality desired by the present systems and methods in order to address a high variability of possible gestures, different types of base classifiers can be applied for modeling all the dynamics that a user interaction process has. The stacked generalization technique, a meta-classifier, improves generalization performance, and this represents an important criterion when modelling processes using machine learning techniques.

In at least one embodiment described herein, the meta-learning approach at step S120 is organized in two layers. The first layer provides multiple classifications of the user interaction using the features selected by the PCA algorithm, while the second layer classifies the user interaction using the information (output) given by the first layer. It should be note that, different from the standard approach, the features used in the second layer are composed of both the predicted labels (−1 or +1) and the classification scores (continuous real values) produced by the classifiers from the first layer. In prior approaches, the second layer received as features only the predicted labels of the base classifiers. In the present systems and methods, the classification scores are used as well, but they are interpreted as unnormalized log-probabilities and they are transformed as follows:

$$s^* = \left(e^s/(e^s + e^{-s})\right) * 2 - 1,$$

where e is the Euler number, s is the classification score of a base classifier and s* is the score normalized between −1 and 1.

In at least one embodiment disclosed herein, as classification techniques, the present systems and methods use binary classifiers that distinguish between two classes, a positive (+1) class corresponding to the Genuine User and a negative (−1) class corresponding to Impostor Users. The Genuine User class represents the user to be verified, while the Impostor User class represents the attackers who try to impersonate the actual user during the verification process.

For the first layer of the stacked generalization technique, the following classifiers can be used:

Support Vector Machines (SVM)—Support Vector Machines try to find the vector of weights that defines the hyperplane that maximally separates the training examples belonging to the two classes. The training samples that fall inside the maximal margin are called support vectors.

Naïve Bayes Classifier (NB)—The NB classification technique can be applied to binary classification problems as well as multi-class problems. The method is based on Bayes Theorem with an assumption of independence among predictors. A NB classifier assumes that the presence of a particular feature in a class is unrelated to the presence of any other feature. For some types of probability models, NB classifiers can be trained very efficiently in a supervised learning setting. In many practical applications, parameter estimation for NB models is based on the maximum likelihood method. Despite of its simplicity, Naïve Bayes can often outperform more sophisticated classification methods.

Multi-Layer Perceptron (MLP)—The Multi-Layer Perceptron, also known as feed-forward neural networks, is organized into sequential layers of perceptron units. The information through the network moves in only one direction, from the input layer, through the hidden layers and to the output layers, without forming any cycles. Neural networks for multi-class classification problems can be trained using gradient descent or variants of the gradient descent algorithm in order to minimize a loss function. The training process is based on alternating two steps, a forward pass and backward pass, until the model's prediction error is sufficiently low. The forward pass consists of passing the training data through the model in order to predict the class labels. In the backward pass, the error given by the current predictions is used to update the model in order to improve the model and reduce its error. In order to update the model's weights, the errors are back-propagated through the network. After several iterations (epochs) over the training data, the algorithm finds the model's weights that minimize the prediction error on the training set. This is done by making small adjustments to the model's weights that move it along the gradient (slope) of the loss function down towards a minimum error value.

Random Forest Classifier (RF)—The Random Forest Classifier is an ensemble learning method used for binary and multi-class classification problems, that operates by constructing a multitude of decision trees at training time and outputting the class that is the mode of the classes. A decision tree (as a predictive model) goes from observations about an item (represented in the branches) to conclusions about the item's class label (represented in the leaves).

Kernel Ridge Regression (KRR)—Kernel Ridge Regression is technique that combines Ridge Regression with the kernel trick, thus learning a linear function in the space induced by a kernel function. Kernel Ridge Regression selects the vector of weights that simultaneously has small empirical error and small norm in the Reproducing Kernel Hilbert Space generated by the kernel function.

As a meta-classifier, the present systems and methods can use Support Vector Machines classifiers in accordance with at least one embodiment. It yields good performance in terms of accuracy, False Acceptance Rate (FAR) and False Rejection Rate (FRR). It is noted that the stacked generalization technique boosts the accuracy by around 1-2% over the best base classifier. The base classifiers are trained independently, using specific optimization techniques. For training, a standard supervised learning process is used in which a classifier is trained on a set of feature vectors with corresponding labels (indicating the user that produced the motion signal from which the feature vector is obtained by feature extraction and selection) such that the classifier learns to predict, as accurately as possible, the target labels. In this regard, for example, the SVM classifier is trained using Sequential Minimal Optimization, the NB model is trained using Maximum Likelihood Estimation, the MLP is trained using Stochastic Gradient Descent with Momentum, the RF classifier is constructed based on Gini Impurity, and KRR is trained by Cholesky decomposition.

Figure 12B:
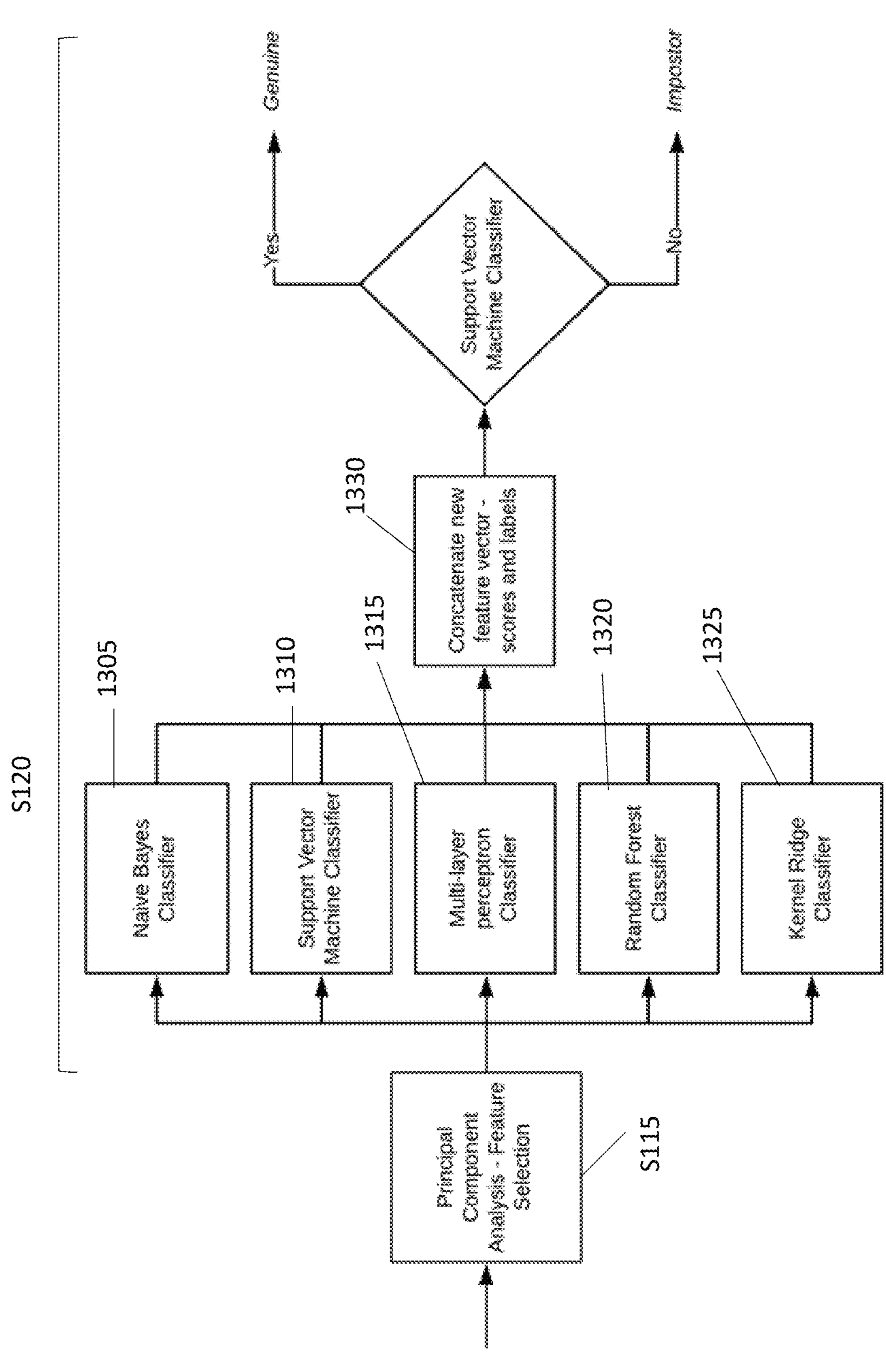

FIGS. 12A-12B presents the computation flow of the approach to verify a user based on interaction with a mobile device measuring it through mobile sensors in accordance with one or more embodiments disclosed herein. In particular, FIGS. 12A-12B display exemplary feature extraction (S110), feature selection (S115), and classification (S120) steps in accordance with one of more embodiments of the present method.

In FIG. 12A (as discussed above for FIG. 11), at step S110, the processor of the mobile device is configured by executing one or more software modules, including the feature extraction module, to extract a set of features from the collected motion signals 1105 using one or more of: statistical feature extraction technique 1110, correlation features extraction technique 1115, Mel Frequency Cepstral Coefficients (MFCC) 1120, Shifted Delta Cepstral (SDC) 1125, Histogram of Oriented Gradients (HOG) 1130, Markov Transition Matrix 1135 and deep embeddings extracted with Convolutional Neural Networks (CNN) 1140. The set of features extracted from the collected motion signals can be in the form of concatenated feature vectors 1145.

At step S115 the processor of the mobile device is configured by executing the feature selection module, to select a subset of discriminative features from the set of extracted features (feature vectors 1145) of the user. The feature selection module utilizes the Principle Component Analysis approach to rank the extracted features based on their respective levels of variability among users.

Turning now to FIG. 12B, once the subset of discriminative features has been selected, at step S120, the processor of the mobile device is configured by executing one or more software modules, including the classification module, to classify the user as a genuine user or an imposter user based on a classification score generated by the classification algorithm(s) from an analysis of the subset of discriminative features. One or more of the following classifiers are used as classification algorithms for step S120: Naïve Bayes classifier 1305, Support Vector Machine (SVM) classifier 1310, Multi-layer Perception classifier 1315, Random Forest classifier 1320, and Kernel Ridge Regression (KRR) 1325. The classification of the subset of discriminative features results in the generation of a classification score 1330 for the user. This classification score is specific to the captured motion signals of the user. At step S120, the classification score 1330 can also be stored in the storage or database of the mobile device or a system server operatively connected to the mobile device via a network. In one or more embodiments, the classification score can be determined via an analysis of one or more scores generated by each of the classification algorithms.

As discussed above with reference to FIG. 1 and FIGS. 12A-12B, steps S105-S120 can be performed in accordance with an enrollment stage and an authentication stage. Specifically, in the enrollment stage, motion sensor data of a particular user are collected by the user's mobile device. This motion sensor data is analyzed and processed to extract features (or characteristics) present in the data and to generate classification score 1330, which is later useable to authenticate the user in an authentication stage. For instance, in an authentication stage, steps S105-S120 can be performed again in order to determine, based on the classification score, whether the user is a genuine user or an imposter user.

Figure 13:
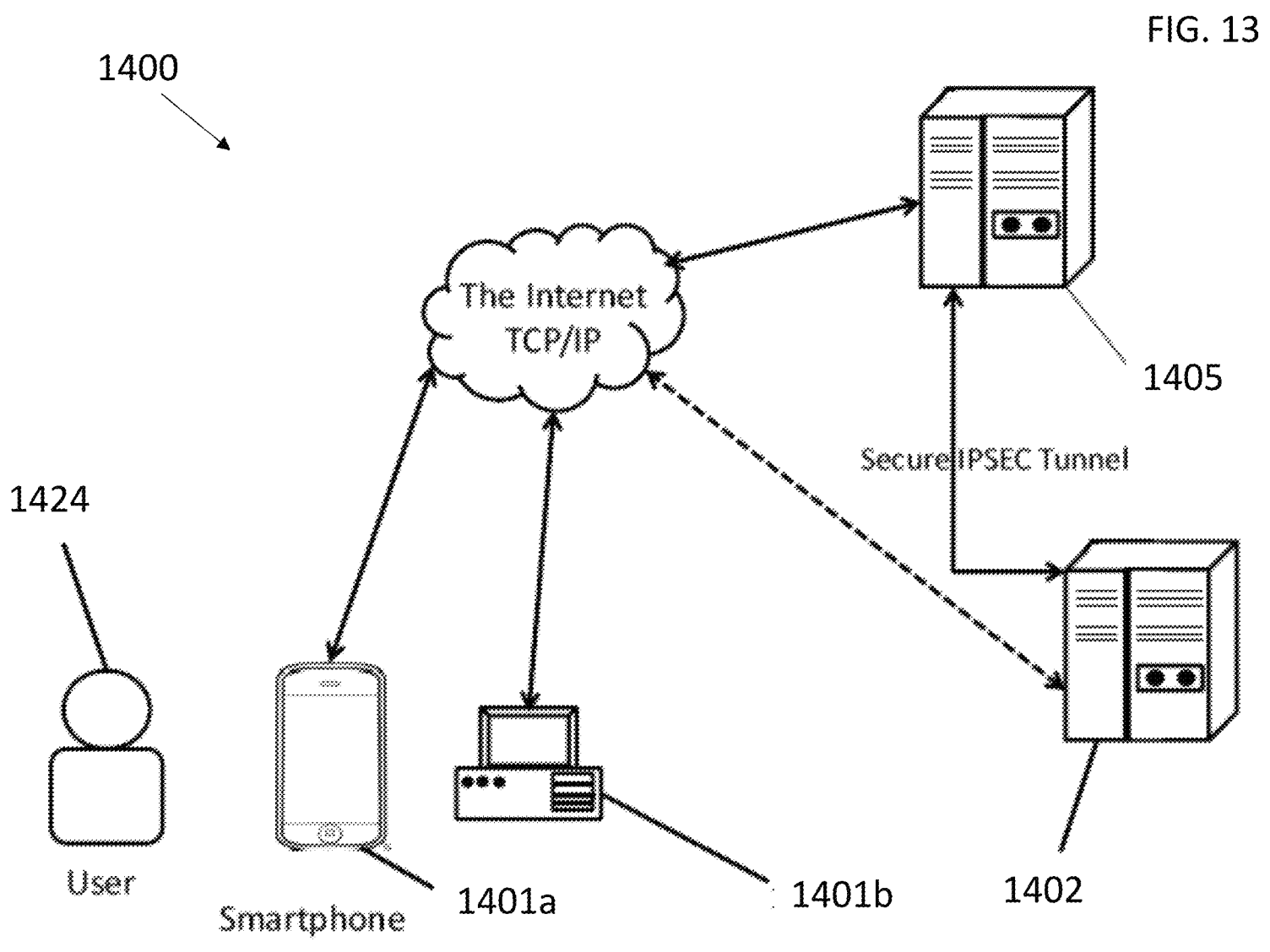

As discussed above, the present methods can be implemented using one or more aspects of the present system as exemplified in FIG. 13. FIG. 13 discloses a high-level diagram of the present system 1400 for user recognition using motion sensor data in accordance with one or more embodiments. In some implementations, the system includes a cloud-based system server platform that communicates with fixed PC's, servers, and devices such as smartphones, tablets, and laptops operated by users. As the user attempts to access a networked environment that is access controlled, for example a website which requires a secure login, the user is prompted to authenticate using the user's mobile device. Authentication can then include verifying (authenticating) the user's identity based on the mobile sensor data captured by the mobile device.

In one arrangement, the system 1400 consists of a system server 1405 and user devices including a mobile device 1401*a* and a user computing device 1401*b*. The system 1400 can also include one or more remote computing devices 1402.

The system server 1405 can be practically any computing device and/or data processing apparatus capable of communicating with the user devices and remote computing devices and receiving, transmitting and storing electronic information and processing requests as further described herein. Similarly, the remote computing device 1402 can be practically any computing device and/or data processing apparatus capable of communicating with the system server and/or the user devices and receiving, transmitting and storing electronic information and processing requests as further described herein. It should also be understood that the system server and/or remote computing device can be a number of networked or cloud-based computing devices.

In one or more embodiments, the user devices—mobile device 1401*a* and user computing device 1401*b*—can be configured to communicate with one another, the system server 105 and/or remote computing device 102, transmitting electronic information thereto and receiving electronic information therefrom. The user devices can be configured to capture and process motion signals from the user, for example, corresponding to one or more gestures (interactions) from a user 1424.

The mobile device 1401*a* can be any mobile computing devices and/or data processing apparatus capable of embodying the systems and/or methods described herein, including but not limited to a personal computer, tablet computer, personal digital assistant, mobile electronic device, cellular telephone or smart phone device and the like. The computing device 1401*b* is intended to represent various forms of computing devices that a user can interact with, such as workstations, a personal computer, laptop computer, access control devices or other appropriate digital computers.

It should be noted that while FIG. 13 depicts the system 1400 for user recognition with respect to a mobile device 1401*a* and a user computing device 1401*b* and a remote computing device 1402, it should be understood that any number of such devices can interact with the system in the manner described herein. It should also be noted that while FIG. 13 depicts a system 1400 for user recognition with respect to the user 1424, it should be understood that any number of users can interact with the system in the manner described herein.

It should be further understood that while the various computing devices and machines referenced herein, including but not limited to mobile device 1401*a* and system server 1405 and remote computing device 1402 are referred to herein as individual/single devices and/or machines, in certain implementations the referenced devices and machines, and their associated and/or accompanying operations, features, and/or functionalities can be combined or arranged or otherwise employed across a number of such devices and/or machines, such as over a network connection or wired connection, as is known to those of skill in the art.

It should also be understood that the exemplary systems and methods described herein in the context of the mobile device 1401*a* (also referred to as a smartphone) are not specifically limited to the mobile device and can be implemented using other enabled computing devices (e.g., the user computing device 1402*b*).

Figure 14A:
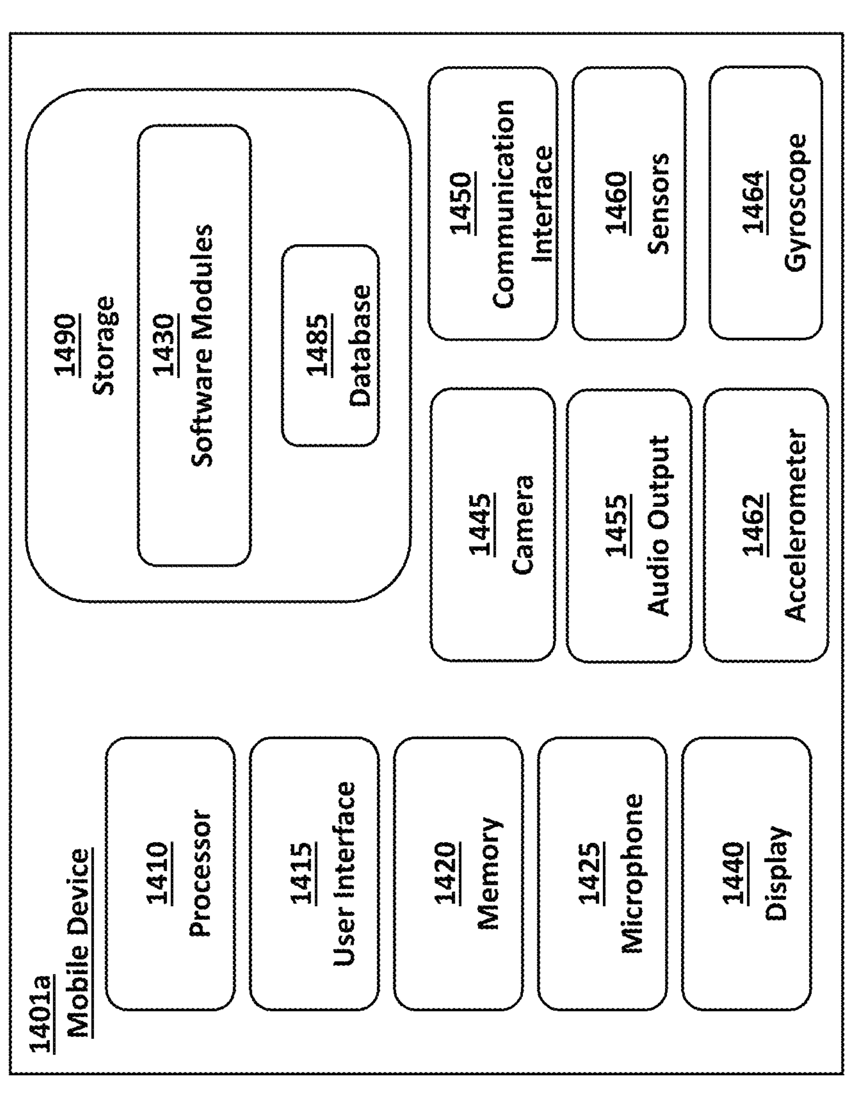
FIG. 14A is a block diagram of a computer system for user recognition using motion sensor data in accordance with at least one embodiment disclosed herein.

With reference now to FIG. 14A, mobile device 1401*a* of the system 1400, includes various hardware and software components that serve to enable operation of the system, including one or more processors 1410, a memory 1420, a microphone 1425, a display 1440, a camera 1445, an audio output 1455, a storage 1490 and a communication interface 1450. Processor 1410 serves to execute a client application in the form of software instructions that can be loaded into memory 1420. Processor 1410 can be a number of processors, a central processing unit CPU, a graphics processing unit GPU, a multi-processor core, or any other type of processor, depending on the particular implementation.

Preferably, the memory 1420 and/or the storage 1490 are accessible by the processor 1410, thereby enabling the processor to receive and execute instructions encoded in the memory and/or on the storage so as to cause the mobile device and its various hardware components to carry out operations for aspects of the systems and methods as will be described in greater detail below. Memory can be, for example, a random access memory (RAM) or any other suitable volatile or non-volatile computer readable storage medium. In addition, the memory can be fixed or removable. The storage 1490 can take various forms, depending on the particular implementation. For example, the storage can contain one or more components or devices such as a hard drive, a flash memory, a rewritable optical disk, a rewritable magnetic tape, or some combination of the above. Storage also can be fixed or removable.

Figure 14B:
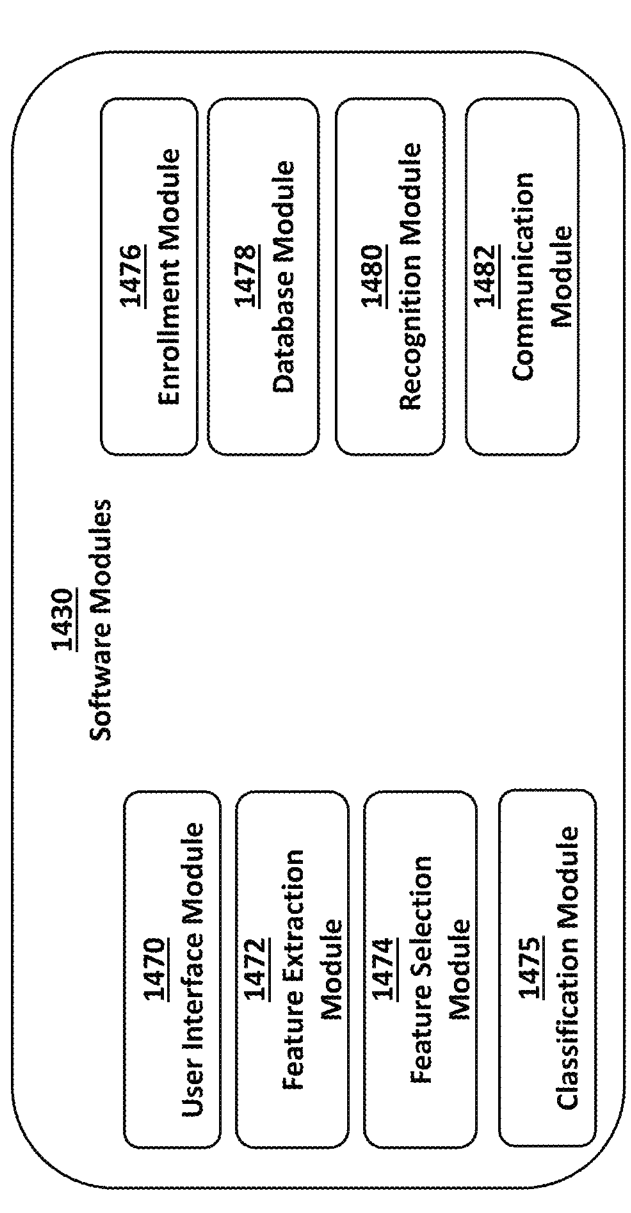
FIG. 14B is a block diagram of a software module for user recognition using motion sensor data in accordance with at least one embodiment disclosed herein.

One or more software modules 1430 are encoded in the storage 1490 and/or in the memory 1420. The software modules 1430 can comprise one or more software programs or applications having computer program code, or a set of instructions executed in the processor 1410. As depicted in FIG. 14B, preferably, included among the software modules 1430 is a user interface module 1470, a feature extraction module 1472, a feature selection module 1474, a classification module 1475 an enrollment module 1476, a database module 1478, a recognition module 1480 and a communication module 1482 that are executed by processor 1410. Such computer program code or instructions configure the processor 1410 to carry out operations of the systems and methods disclosed herein and can be written in any combination of one or more programming languages.

The program code can execute entirely on mobile device 1401*a*, as a stand-alone software package, partly on mobile device, partly on system server 1405, or entirely on system server or another remote computer/device. In the latter scenario, the remote computer can be connected to mobile device 1401*a* through any type of network, including a local area network (LAN) or a wide area network (WAN), mobile communications network, cellular network, or the connection can be made to an external computer (for example, through the Internet using an Internet Service Provider).

It can also be said that the program code of software modules 1430 and one or more computer readable storage devices (such as memory 1420 and/or storage 1490) form a computer program product that can be manufactured and/or distributed in accordance with the present invention, as is known to those of ordinary skill in the art.

It should be understood that in some illustrative embodiments, one or more of the software modules 1430 can be downloaded over a network to storage 1490 from another device or system via communication interface 1450 for use within the system 1400. In addition, it should be noted that other information and/or data relevant to the operation of the present systems and methods (such as database 1485) can also be stored on storage. Preferably, such information is stored on an encrypted data-store that is specifically allocated so as to securely store information collected or generated by the processor executing the secure authentication application. Preferably, encryption measures are used to store the information locally on the mobile device storage and transmit information to the system server 105. For example, such data can be encrypted using a 1024 bit polymorphic cipher, or, depending on the export controls, an AES 256 bit encryption method. Furthermore, encryption can be performed using remote key (seeds) or local keys (seeds). Alternative encryption methods can be used as would be understood by those skilled in the art, for example, SHA256.

In addition, data stored on the mobile device 1401*a* and/or system server 1405 can be encrypted using a user's motion sensor data or mobile device information as an encryption key. In some implementations, a combination of the foregoing can be used to create a complex unique key for the user that can be encrypted on the mobile device using Elliptic Curve Cryptography, preferably at least 384 bits in length. In addition, that key can be used to secure the user data stored on the mobile device and/or the system server.

Also, in one or more embodiments, a database 1485 is stored on storage 1490. As will be described in greater detail below, the database contains and/or maintains various data items and elements that are utilized throughout the various operations of the system and method 1400 for user recognition. The information stored in database can include but is not limited to user motion sensor data templates and profile information, as will be described in greater detail herein. It should be noted that although database is depicted as being configured locally to mobile device 1401*a*, in certain implementations the database and/or various of the data elements stored therein can, in addition or alternatively, be located remotely (such as on a remote device 1402 or system server 1405—not shown) and connected to mobile device through a network in a manner known to those of ordinary skill in the art.

A user interface 1415 is also operatively connected to the processor. The interface can be one or more input or output device(s) such as switch(es), button(s), key(s), a touch-screen, microphone, etc. as would be understood in the art of electronic computing devices. User interface 1415 serves to facilitate the capture of commands from the user such as an on-off commands or user information and settings related to operation of the system 1400 for user recognition. For example, in at least one embodiment, the interface 1415 can serves to facilitate the capture of certain information from the mobile device 1401*a* such as personal user information for enrolling with the system so as to create a user profile.

The computing device 1401*a* can also include a display 1440 which is also operatively connected to processor 1410. The display includes a screen or any other such presentation device which enables the system to instruct or otherwise provide feedback to the user regarding the operation of the system 1400 for user recognition. By way of example, the display can be a digital display such as a dot matrix display or other 2-dimensional display.

By way of further example, the interface and the display can be integrated into a touch screen display. Accordingly, the display is also used to show a graphical user interface, which can display various data and provide "forms" that include fields that allow for the entry of information by the user. Touching the touch screen at locations corresponding to the display of a graphical user interface allows the person to interact with the device to enter data, change settings, control functions, etc. So, when the touch screen is touched, user interface communicates this change to processor, and settings can be changed, or user entered information can be captured and stored in the memory.

Mobile device 1401*a* also includes a camera 1445 capable of capturing digital images. The mobile device 1401*a* and/or the camera 1445 can also include one or more light or signal emitters (e.g., LEDs, not shown) for example, a visible light emitter and/or infra-red light emitter and the like. The camera can be integrated into the mobile device, such as a front-facing camera or rear facing camera that incorporates a sensor, for example and without limitation a CCD or CMOS sensor. As would be understood by those in the art, camera 1445 can also include additional hardware such as lenses, light meters (e.g., lux meters) and other conventional hardware and software features that are useable to adjust image capture settings such as zoom, focus, aperture, exposure, shutter speed and the like. Alternatively, the camera can be external to the mobile device 1401*a*. The possible variations of the camera and light emitters would be understood by those skilled in the art. In addition, the mobile device can also include one or more microphones 1425 for capturing audio recordings as would be understood by those skilled in the art.

Audio output 1455 is also operatively connected to the processor 1410. Audio output can be any type of speaker system that is configured to play electronic audio files as would be understood by those skilled in the art. Audio output can be integrated into the mobile device 1401*a* or external to the mobile device 1401*a*.

Various hardware devices/sensors 1460 are also operatively connected to the processor. The sensors 1460 can include: an on-board clock to track time of day, etc.; a GPS enabled device to determine a location of the mobile device; Gravity magnetometer to detect the Earth's magnetic field to determine the 3-dimensional orientation of the mobile device; proximity sensors to detect a distance between the mobile device and other objects; RF radiation sensors to detect the RF radiation levels; and other such devices as would be understood by those skilled in the art.

As discussed above, the mobile device 1401*a* also comprises an accelerometer 1462 and a gyroscope 1464, which are configured to capture motion signals from the user 1424. In at least one embodiment, the accelerometer can also be configured to track the orientation and acceleration of the mobile device. The mobile device 1401*a* can be set (configured) to provide the accelerometer and gyroscope values to the processor 1410 executing the various software modules 1430, including the feature extraction module 1472, feature selection module 1474, and classification module 1475.

Communication interface 1450 is also operatively connected to the processor 1410 and can be any interface that enables communication between the mobile device 1401*a* and external devices, machines and/or elements including system server 1405. Preferably, communication interface includes, but is not limited to, a modem, a Network Interface Card (NIC), an integrated network interface, a radio frequency transmitter/receiver (e.g., Bluetooth, cellular, NFC), a satellite communication transmitter/receiver, an infrared port, a USB connection, and/or any other such interfaces for connecting the mobile device to other computing devices and/or communication networks such as private networks and the Internet. Such connections can include a wired connection or a wireless connection (e.g. using the 802.11 standard) though it should be understood that communication interface can be practically any interface that enables communication to/from the mobile device.

At various points during the operation of the system 1400 for user recognition, the mobile device 1401*a* can communicate with one or more computing devices, such as system server 1405, user computing device 1401*b* and/or remote computing device 1402. Such computing devices transmit and/or receive data to/from mobile device 1401*a*, thereby preferably initiating maintaining, and/or enhancing the operation of the system 1400, as will be described in greater detail below.

Figure 14C:
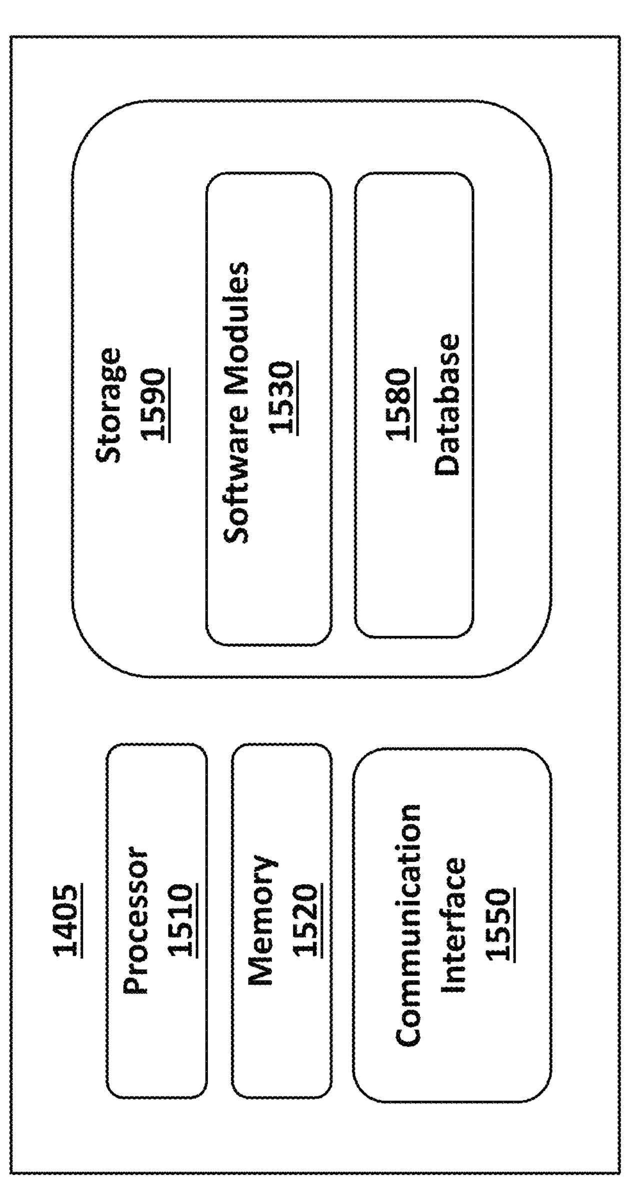
FIG. 14C is a block diagram of a computer system for user recognition using motion sensor data in accordance with at least one embodiment disclosed herein.

FIG. 14C is a block diagram illustrating an exemplary configuration of system server 1405. System server 1405 can include a processor 1510 which is operatively connected to various hardware and software components that serve to enable operation of the system 1400 for user recognition. The processor 1510 serves to execute instructions to perform various operations relating to user recognition as will be described in greater detail below. The processor 1510 can be a number of processors, a multi-processor core, or some other type of processor, depending on the particular implementation.

In certain implementations, a memory 1520 and/or a storage medium 1590 are accessible by the processor 1510, thereby enabling the processor 1510 to receive and execute instructions stored on the memory 1520 and/or on the storage 1590. The memory 1520 can be, for example, a random access memory (RAM) or any other suitable volatile or non-volatile computer readable storage medium. In addition, the memory 1520 can be fixed or removable. The storage 1590 can take various forms, depending on the particular implementation. For example, the storage 1590 can contain one or more components or devices such as a hard drive, a flash memory, a rewritable optical disk, a rewritable magnetic tape, or some combination of the above. The storage 1590 also can be fixed or removable.

One or more of the software modules 1530 are encoded in the storage 1590 and/or in the memory 1520. One or more of the software modules 1530 can comprise one or more software programs or applications (collectively referred to as the "secure authentication server application") having computer program code or a set of instructions executed in the processor 1510. Such computer program code or instructions for carrying out operations for aspects of the systems and methods disclosed herein can be written in any combination of one or more programming languages, as would be understood by those skilled in the art. The program code can execute entirely on the system server 1405 as a stand-alone software package, partly on the system server 1405 and partly on a remote computing device, such as a remote computing device 1402, mobile device 1401*a* and/or user computing device 1401*b*, or entirely on such remote computing devices. As depicted in FIG. 14B, preferably, included among the software modules 1530 are a feature selection module 1474, a classification module 1475 an enrollment module 1476, a database module 1478, a recognition module 1480 and a communication module 1482, that are executed by the system server's processor 1510.

Also preferably stored on the storage 1590 is a database 1580. As will be described in greater detail below, the database 1580 contains and/or maintains various data items and elements that are utilized throughout the various operations of the system 1400, including but not limited to, user profiles as will be described in greater detail herein. It should be noted that although the database 1580 is depicted as being configured locally to the computing device 1405, in certain implementations the database 1580 and/or various of the data elements stored therein can be stored on a computer readable memory or storage medium that is located remotely and connected to the system server 1405 through a network (not shown), in a manner known to those of ordinary skill in the art.

A communication interface 1550 is also operatively connected to the processor 1510. The communication interface 1550 can be any interface that enables communication between the system server 1405 and external devices, machines and/or elements. In certain implementations, the communication interface 1550 includes, but is not limited to, a modem, a Network Interface Card (NIC), an integrated network interface, a radio frequency transmitter/receiver (e.g., Bluetooth, cellular, NFC), a satellite communication transmitter/receiver, an infrared port, a USB connection, and/or any other such interfaces for connecting the computing device 1405 to other computing devices and/or communication networks, such as private networks and the Internet. Such connections can include a wired connection or a wireless connection (e.g., using the 802.11 standard) though it should be understood that communication interface 1550 can be practically any interface that enables communication to/from the processor 1510.

The operation of the system 1400 and its various elements and components can be further appreciated with reference to the methods for user recognition using motion sensor data as described above for FIGS. 1-12. The processes depicted herein are shown from the perspective of the mobile device 1401*a* and/or the system server 1405, however, it should be understood that the processes can be performed, in whole or in part, by the mobile device 1401*a*, the system server 1405 and/or other computing devices (e.g., remote computing device 1402 and/or user computing device 1401*b*) or any combination of the foregoing. It should be appreciated that more or fewer operations can be performed than shown in the figures and described herein. These operations can also be performed in a different order than those described herein. It should also be understood that one or more of the steps can be performed by the mobile device 1401*a* and/or on other computing devices (e.g. computing device 1401*b*, system server 1405 and remote computing device 1402).

At this juncture, it should be noted that although much of the foregoing description has been directed to systems and methods for user recognition using motion sensor data, the systems and methods disclosed herein can be similarly deployed and/or implemented in scenarios, situations, and settings beyond the referenced scenarios.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. It should be noted that use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items. It is to be understood that like numerals in the drawings represent like elements through the several figures, and that not all components and/or steps described and illustrated with reference to the figures are required for all embodiments or arrangements.

Thus, illustrative embodiments and arrangements of the present systems and methods provide a computer implemented method, computer system, and computer program product for user recognition using motion sensor data. The flowchart and block diagrams in the figures illustrate the architecture, functionality, and operation of possible implementations of systems, methods and computer program products according to various embodiments and arrangements. In this regard, each block in the flowchart or block diagrams can represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The subject matter described above is provided by way of illustration only and should not be construed as limiting. Various modifications and changes can be made to the subject matter described herein without following the example embodiments and applications illustrated and described, and without departing from the true spirit and scope of the present invention, which is set forth in the following claims.

What is claimed is:

1. A method, comprising:

receiving an access request from a mobile device;

obtaining a motion signal associated with a user captured by at least one motion sensor communicatively coupled to the mobile device;

extracting, with a processor applying a plurality of feature extraction algorithms to the captured motion signal, sets of features from the motion signal, wherein each individual set of features includes discriminative and non-discriminative features extracted from the motion signal by a respective feature extraction algorithm among the plurality of feature extraction algorithms, wherein the plurality of feature extraction algorithms comprise at least one of Mel Frequency Cepstral Coefficients (MFCC), Shifted Delta Cepstral (SDC), Histogram of Oriented Gradients (HOG), Markov Transition Matrix, and deep embeddings extracted with Convolutional Neural Networks (CNN);

selecting, with the processor using a feature selection algorithm, a subset of discriminative features from the sets of extracted features, wherein the feature selection algorithm comprises a principal component analysis algorithm;

classifying, with the processor using a classification algorithm, the user as a genuine user or an imposter user based on a classification score generated by the classification algorithm from an analysis of the subset of discriminative features, wherein the classification algorithm comprises a stacked generalization technique, and wherein the stacked generalization technique utilizes one or more of the following classifiers: (1) Naïve Bayes classifier, (2) Support Vector Machine (SVM) classifier, (3) Multi-layer Perception classifier, (4) Random Forest classifier, (5) and Kernel Ridge Regression (KRR);

in response to classifying the user as the genuine user, transmitting an access grant to the mobile device; and in response to classifying the user as the imposter user, transmitting an access denial to the mobile device.

2. The method of claim 1, wherein the plurality of feature extraction algorithms are run in parallel on the motion signal.

3. The method of claim 1, wherein each of the plurality of feature extraction algorithms is applied to the entire captured motion signal.

4. The method of claim 1, wherein the at least one motion sensor comprises an accelerometer and a gyroscope.

5. The method of claim 1, further comprising:

combining the sets of extracted features to form a combined set of extracted features, and wherein the subset of discriminative features is selected from the combined set of extracted features.

6. The method of claim 1, wherein the plurality of feature extraction algorithms comprise (1) statistical analysis feature extraction technique, (2) correlation features extraction technique, (3) Mel Frequency Cepstral Coefficients (MFCC), (4) Shifted Delta Cepstral (SDC), (5) Histogram of Oriented Gradients (HOG), (6) Markov Transition Matrix and (7) deep embeddings extracted with Convolutional Neural Networks (CNN).

7. The method of claim 1, wherein the feature selection algorithm comprises a principal component analysis algorithm, which configures the processor to:

rank the extracted features based on the level of variability of the feature between users; and select the features with the highest levels of variability to form the subset of discriminative features.

8. The method of claim 1, wherein the CNN utilizes five independently trained architectures.

9. The method of claim 1, wherein the motion signal corresponds to one or more explicit or implicit interactions between the user and the motion sensor.

10. A system, comprising:

a network communication interface;

a computer-readable storage medium;

a processor configured to interact with the network communication interface and the computer readable storage medium and execute one or more software modules stored on the storage medium, comprising:

a software module that when executed configures the processor to receive an access request from a mobile device and to obtain a motion signal associated with a user captured by at least one motion sensor communicatively coupled to the mobile device;

a feature extraction module that when executed configures the processor to:

extract sets of features from the captured motion signal using a plurality of feature extraction algorithms, wherein each individual set among the sets of extracted features includes features extracted from the captured motion signal by a respective feature extraction algorithm of the feature extraction module, and wherein the plurality of feature extraction algorithms comprise at least one of Mel Frequency Cepstral Coefficients (MFCC), Shifted Delta Cepstral (SDC), Histogram of Oriented Gradients (HOG), Markov Transition Matrix, and deep embeddings extracted with Convolutional Neural Networks (CNN); and a feature selection module that when executed configures the processor to select a subset of discriminative features from the sets of extracted features, wherein the feature selection module comprises a principal component analysis algorithm; and a classification module that when executed configures the processor to classify a user as a genuine user or an imposter user based on a classification score generated by one or more classifiers of the classification module from an analysis of the subset of discriminative features, wherein the classification module when executed configures the processor to classify the subset of discriminative features using a stacked generalization technique, and wherein the stacked generalization technique utilizes one or more of the following classifiers: (1) Naïve Bayes classifier, (2) Support Vector Machine (SVM) classifier, (3) Multi-layer Perception classifier, (4) Random Forest classifier, (5) and Kernel Ridge Regression (KRR), wherein the software module, when executed, further configures the processor to transmit an access grant to the mobile device in response to classifying the user as the genuine user and to transmit an access denial to the mobile device in response to classifying the user as the imposter user.

11. The system of claim 10, wherein the at least one motion sensor comprises an accelerometer and a gyroscope.

12. The system of claim 10, wherein the plurality of feature extraction algorithms comprise (1) statistical analysis feature extraction technique, (2) correlation features extraction technique, (3) Mel Frequency Cepstral Coefficients (MFCC), (4) Shifted Delta Cepstral (SDC), (5) Histogram of Oriented Gradients (HOG), (6) Markov Transition Matrix and (7) deep embeddings extracted with Convolutional Neural Networks (CNN).

13. The system of claim 10, wherein the feature extraction module when executed configures the processor to run the plurality of feature extraction algorithms in parallel on the motion signal.

14. The system of claim 10, wherein the feature extraction module when executed configures the processor to apply the plurality of feature extraction algorithms to the entire captured motion signal.

15. The system of claim 10, wherein the feature selection module comprises a principal component analysis algorithm that, when executed, configures the processor to:

rank the extracted features based on the level of variability of the feature between users; and select the features with the highest levels of variability to form the subset of discriminative features.

16. The system of claim 10, wherein the CNN utilizes five independently trained architectures.

17. The system of claim 10, wherein the HOG technique employs two gradient orientations.

18. The system of claim 10, wherein the feature extraction module further configures the processor to combine the sets of extracted features to form a combined set of extracted features, and wherein the feature selection module configures the processor to select the subset of discriminative features from the combined set of extracted features.

* * * * *